(12) United States Patent
Tang

(10) Patent No.: US 11,638,226 B2
(45) Date of Patent: Apr. 25, 2023

(54) METHOD AND DEVICE FOR PROCESSING SYNCHRONIZATION SIGNAL BLOCK INFORMATION AND COMMUNICATION DEVICE

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/353,732

(22) Filed: Jun. 21, 2021

(65) Prior Publication Data

US 2021/0321349 A1 Oct. 14, 2021

Related U.S. Application Data

(63) Continuation of application No. PCT/CN2019/114202, filed on Oct. 30, 2019.

(51) Int. Cl.
*H04W 56/00* (2009.01)
*H04L 5/00* (2006.01)
*H04W 76/11* (2018.01)

(52) U.S. Cl.
CPC ........ *H04W 56/001* (2013.01); *H04L 5/0051* (2013.01); *H04W 76/11* (2018.02)

(58) Field of Classification Search
None
See application file for complete search history.

(56) References Cited

U.S. PATENT DOCUMENTS

2018/0205585 A1 7/2018 Sadiq et al.
2018/0288737 A1 10/2018 Islam
(Continued)

FOREIGN PATENT DOCUMENTS

CN 108012329 A 5/2018
CN 108024310 A 5/2018
(Continued)

OTHER PUBLICATIONS

Fujitsu: "Enhancements to initial access procedure and scheduling request procedure for NE-U", 3GPP R1-1900244, Jan. 20, 2019, XP051593159 (Year: 2019).*
(Continued)

*Primary Examiner* — Saba Tsegaye
(74) *Attorney, Agent, or Firm* — Morgan, Lewis & Bockius LLP

(57) ABSTRACT

A synchronization signal block information processing method includes: obtaining, by a terminal device, identifiers of multiple SS/PBCH blocks (SSBs), wherein the identifier of the SSB is determined in accordance with demodulation reference signal (DMRS) sequences of physical broadcast channels (PBCHs), and the identifier of the SSB is used for indicating a transmission position of the SSB within a set period of time; obtaining, by the terminal device, first indication information, wherein the first indication information is used for indicating a first quantity, and the first quantity is no more than a number of the SSBs sent by a network device within the set period of time; and determining, by the terminal device, a first SSB in the multiple SSBs and a second SSB in the multiple SSBs are quasi-co-located (QCL) in accordance with an identifier of the first SSB, an identifier of the second SSB and the first indication information.

28 Claims, 6 Drawing Sheets

(56) References Cited

U.S. PATENT DOCUMENTS

| | | | |
|---|---|---|---|
| 2018/0324678 A1 | 11/2018 | Chen et al. | |
| 2019/0149383 A1* | 5/2019 | Ko | H04L 27/2666 |
| | | | 370/329 |
| 2020/0154341 A1* | 5/2020 | Sun | H04W 72/14 |
| 2021/0007072 A1* | 1/2021 | Wu | H04W 56/001 |
| 2021/0014807 A1* | 1/2021 | Liu | H04W 56/001 |
| 2021/0045076 A1* | 2/2021 | Tomeba | H04B 7/0617 |
| 2021/0068085 A1* | 3/2021 | Chen | H04B 7/0891 |
| 2021/0367825 A1* | 11/2021 | Tang | H04L 5/0053 |

FOREIGN PATENT DOCUMENTS

| | | |
|---|---|---|
| CN | 108496321 A | 9/2018 |
| CN | 108496395 A | 9/2018 |
| CN | 109041250 A | 12/2018 |
| CN | 109076556 A | 12/2018 |
| CN | 109150473 A | 4/2019 |
| EP | 3457792 A1 | 3/2019 |
| WO | WO2018123468 A1 | 7/2018 |
| WO | WO2018/144790 A1 | 8/2018 |
| WO | WO2018/231014 A1 | 12/2018 |
| WO | WO2018228433 A1 | 12/2018 |
| WO | WO2020/164142 A1 | 8/2020 |
| WO | WO2020/164258 A1 | 8/2020 |

OTHER PUBLICATIONS

Guangdong OPPO Mobile Telecommunications Corp., Ltd., International Search Report and Written Opinion, PCT/CN2019/114202, dated Jan. 15, 2020, 14 pgs.

Guangdong OPPO Mobile Telecommunications Corp., Ltd., International Search Report and Written Opinion, PCT/CN2019/075282, dated Oct. 28, 2019, 12 pgs.

NTT DOCOMO, Inc., Maintenance for NR random access, 3GPP TSG RAN WG1 Meeting #94, R1-1809135, Gothenburg, Sweden, Aug. 20-24, 2018, 16 pgs.

3GPP TS, 3rd Generation Partnership Project, Technical Specification Group Radio Access Network, NR, Physical layer procedures for conrol, (Release 15), 38.213, v15.2.0, (Jun. 2018), 98 pgs.

Guangdong OPPO Mobile Telecommunications Corp., Ltd., Extended European Search Report, EP19915030.1, dated Dec. 17, 2021, 10 pgs.

Guangdong OPPO Mobile Telecommunications Corp., Ltd., Examination Report, IN202117026240, dated Apr. 29, 2022, 7 pgs.

Guangdong OPPO Mobile Telecommunications Corp., Ltd., Communication Pursuant to Article 94(3), EP19915030.1, dated Sep. 26, 2022, 6 pgs.

Guangdong OPPO Mobile Telecommunications Corp., Ltd., First Office Action, CN202110426940.7, dated Aug. 12, 2022, 23 pgs.

* cited by examiner

METHOD AND DEVICE FOR PROCESSING SYNCHRONIZATION SIGNAL BLOCK INFORMATION AND COMMUNICATION DEVICE

The present application is a continuation application of PCT Patent Application No. PCT/CN2019/114202, entitled "METHOD AND DEVICE FOR PROCESSING SYNCHRONIZATION SIGNAL BLOCK INFORMATION AND COMMUNICATION DEVICE" filed on Oct. 30, 2019, which claims the priority of the PCT application No. PCT/CN2019/075282 filed on Feb. 15, 2019, entitled "METHOD AND DEVICE FOR PROCESSING SYNCHRONIZATION SIGNAL BLOCK INFORMATION AND COMMUNICATION DEVICE", the disclosures of both of which are incorporated herein by reference in their entirety.

TECHNICAL FIELD

Embodiments of the present application relate to the field of communication, and in particular to a synchronization signal block information processing method and device, and a communication device.

BACKGROUND

In a new radio (NR) mobile communication system (referred to as a NR system), a network device can transmit a synchronization signal block (SS/PBCH block, SSB) to a terminal device. When the NR system works on a licensed spectrum, the network device sends the SSB according to a certain period. Within the SSB transmission period, a transmission position of each SSB is fixed. For each transmission position of the SSB, a number can be assigned to the SSB transmitted at this position, and the number is sequentially numbered according to the order of the positions where the SSBs are transmitted. On the one hand, the number can reflect the transmission order of the SSBs in the SSB transmission period. On the other hand, the number can also reflect a quasi co-located (QCL) relationship between the SSBs. After the terminal device receives the SSBs, if it is determined that the numbers of two SSBs are the same, it is considered that the two SSBs are QCL.

With the rapid development of wireless communication technologies, spectrum resources are increasingly scarce. In order to solve the problem of less available resources in the licensed spectrum, the NR system may not rely on the licensed spectrum, but completely work on an unlicensed spectrum. The NR system that works on the unlicensed spectrum can be called a new radio-unlicensed (NR-U) system. On the unlicensed spectrum on which the NR-U system works, channel resources are shared, and thus it may not be able to guarantee that the SSBs are transmitted in the fixed positions. Accordingly, the terminal device may not be able to determine the QCL SSBs through the numbers corresponding to the fixed positions.

SUMMARY

According to a first aspect of the embodiments of the present application, there is provided a synchronization signal block information processing method in which a terminal device can determine whether a first SSB and a second SSB are QCL or not according to identifiers of the first SSB and the second SSB, and first indication information, where the identifier indicates a transmission position of the SSB within a set period of time.

As a possible design, the first indication information is used for indicating a first quantity which is related to a number of SSBs sent by a network device within the set period of time.

As a possible design, the identifiers of the first SSB and the second SSB are SSB numbers.

As a possible design, the terminal device can determine whether the first SSB and the second SSB are QCL through the process of:

determining that the first SSB and the second SSB are QCL when a result of the SSB number of first SSB mod the first quantity is equal to the result of the SSB number of the second SSB mod the first quantity.

In the method according to the embodiments, the network device sends the SSBs at specific positions according to the first indication information. After receiving the SSBs, the terminal device can determine the QCL relationship between the SSBs according to the identifiers of the SSBs and the first indication information. With this method, it cannot only ensure that the terminal device accurately obtains the QCL relationship between the SSBs, but also effectively use the channel resources between a start position of the channel occupation and a start position of the SSB transmission, and thus ensure a utilization efficiency of the system resources in the unlicensed spectrum.

According to a second aspect of the embodiments of the present application, there is provided a synchronization signal block information processing method in which a network device can send a first SSB and a second SSB to a terminal device, so that the terminal device can determine whether the first SSB and the second SSB are quasi-co-located (QCL) or not according to an identifier of the first SSB, an identifier of the second SSB, and first indication information, where the identifier indicates a transmission position of the SSB within a set period of time.

In the method according to the embodiments, the network device sends the SSBs at specific positions according to the first indication information. After receiving the SSBs, the terminal device can determine the QCL relationship between the SSBs according to the identifiers of the SSBs and the first indication information. With this method, it cannot only ensure that the terminal device accurately obtains the QCL relationship between the SSBs, but also effectively use the channel resources between a start position of the channel occupation and a start position of the SSB transmission, and thus ensure a utilization efficiency of the system resources in the unlicensed spectrum.

As a possible design, the first indication information is used for indicating a first quantity which is related to a number of SSBs sent by a network device within the set period of time.

As a possible design, the identifiers of the first second SSBs are SSB numbers.

In the first and second aspects above, as a possible design, the first indication information and the first quantity can be implemented by any of the following three manners.

In a first manner, the first indication information includes a number of the sent SSBs, and the first quantity is the number of the sent SSBs.

In a second manner, the first indication information includes n, and the first quantity is obtained by rounding up the number of the sent SSBs up to nth power of 2, where n is an integer greater than or equal to 0.

In this manner, if the number of the SSBs actually sent by the network device is 1, the first quantity may be 1, 2, 4, or 8, and the network device can indicate that the first quantity is one of 1, 2, 4 and 8 through the first indication information, and correspondingly, the terminal device determines that the first quantity is the one of 1, 2, 4 and 8 through the first indication information.

If the number of the SSBs actually sent by the network device is 2, the first quantity may be 2, 4, or 8, and the network device can indicate that the first quantity is one of 2, 4 and 8 through the first indication information, and correspondingly, the terminal device determines that the first quantity is the one of 2, 4 and 8 through the first indication information.

If the number of the SSBs actually sent by the network device is 3, the first quantity may be 4, or 8, and the network device can indicate that the first quantity is one of 4 and 8 through the first indication information, and correspondingly, the terminal device determines that the first quantity is the one of 4 and 8 through the first indication information.

If the number of the SSBs actually sent by the network device is 4, the first quantity may be 4 or 8, and the network device can indicate that the first quantity is one of 4 and 8 through the first indication information, and correspondingly, the terminal device determines that the first quantity is the one of 4 and 8 through the first indication information.

If the number of the SSBs actually sent by the network device is 5, the first quantity may be 8, and the network device can indicate that the first quantity is 8 through the first indication information, and correspondingly, the terminal device determines that the first quantity is 8 through the first indication information.

If the number of the SSBs actually sent by the network device is 6, the first quantity may be 8, and the network device can indicate that the first quantity is 8 through the first indication information, and correspondingly, the terminal device determines that the first quantity is 8 through the first indication information.

If the number of the SSBs actually sent by the network device is 7, the first quantity may be 8, and the network device can indicate that the first quantity is 8 through the first indication information, and correspondingly, the terminal device determines that the first quantity is 8 through the first indication information.

If the number of the SSBs actually sent by the network device is 8, the first quantity may be 8, and the network device can indicate that the first quantity is 8 through the first indication information, and correspondingly, the terminal device determines that the first quantity is 8 through the first indication information.

With the method provided in the embodiments, fewer resources can be used to represent the first indication information.

In a third manner, the first indication information includes m, and the first quantity is obtained by rounding up the number of the sent SSBs up to 2 m, where m is an integer greater than or equal to 1.

With the method provided in the embodiments, fewer resources can be used to represent the first indication information.

As a possible design, the first indication information may be indicated in any of the following manners.

In a first manner, the first indication information is indicated by a main information block (MIB).

In a second manner, the first indication information is indicated by information carried by a physical broadcast channel (PBCH).

In a third manner, the first indication information is indicated by a demodulation reference signal (DMRS) sequence of the PBCH.

In a fourth manner, the first indication information is indicated by a system information block (SIB).

In a possible design of this manner, the network device may carry one piece of first indication information in the SIB message, and the first indication information may be applied to all cells at a frequency point corresponding to the SIB message.

The aforementioned SIB message may be a SIB1 message, SIB2 message, SIB3 message, or SIB4 message.

If the SIB message is the SIB1 message, when the SIB1 message carries the first indication information, the first indication information may be applied to a current cell of a current frequency point corresponding to the SIB1 message.

If the SIB message is the SIB2 message or SIB3 message, when the SIB2 message or SIB3 message carries the first indication information, the first indication information may be applied to all cells in the frequency point corresponding to the serving cell or all cells at the frequency point corresponding to the SIB3 message.

If the SIB message is the SIB4 message, the SIB4 message may carry one or more pieces of first indication information, and each piece of first indication information may be applied to all cells at the corresponding frequency point.

In another possible design of this manner, the network device may also carry a first indication information list in the SIB message which includes multiple pieces of first indication information, and each piece of first indication information may be applied to one or more cells.

The aforementioned SIB message may be the SIB3 message or SIB4 message.

If the SIB message is the SIB2 or SIB3 message and the SIB2 or SIB3 message carries the first indication information list, the list includes one or more pieces of first indication information, and each piece of first indication information can be applied to one cell or to multiple cells.

If the SIB message is a SIB4 message, the SIB4 message may carry one or more first indication information lists, and each of the first indication information lists includes one or more pieces of first indication information, and each piece of first indication information can be applied to one cell or to multiple cells.

In a fifth manner, the first indication information is indicated by a radio resource control (RRC) message.

In a possible design of this manner, the network device may carry the first indication information in a RRC reconfiguration message, and the first indication information may be applied to all cells at a frequency point corresponding to the RRC reconfiguration message.

In another possible design of this manner, the network device may also carry one first indication information list in the RRC reconfiguration message, the list includes multiple pieces of first indication information, and each piece of first indication information may be applied to one or more cells.

In a case, the RRC reconfiguration message carries one first indication information list which includes one or more pieces of first indication information, and each piece of first indication information may be applied to one cell.

In another case, the RRC reconfiguration message carries one first indication information list which includes one or more pieces of first indication information, and each piece of first indication information may be applied to multiple cells.

As a possible design, the RRC message includes an RRC reconfiguration message.

As a possible design, the first SSB and the second SSB are within the same set period of time, or in different set periods of time.

As a possible design, the set period of time is half of a frame period, 2 ms, 4 ms, or 8 ms.

According to a third aspect of the embodiments of the present application, there is provided a synchronization signal block information processing device including:

a processing module configured to determine whether a first SSB and a second SSB are quasi-co-located (QCL) or not according to an identifier of the first SSB, an identifier of the second SSB, and first indication information, where the identifier indicates a transmission position of the SSB within a set period of time.

According to a fourth aspect of the embodiments of the present application, there is provided a synchronization signal block information processing device including:

a processing module and a sending module, wherein the processing module is configured to send a first SSB and a second SSB to a terminal device through the sending module, so that the terminal device determines whether the first SSB and the second SSB are quasi-co-located (QCL) or not according to an identifier of the first SSB, an identifier of the second SSB, and first indication information, where the identifier indicates a transmission position of the SSB within a set period of time.

In the above third and fourth aspects, as a possible design, the first indication information is used for indicating a first quantity which is related to a number of SSBs sent by a network device within the set period of time.

As a possible design, the first indication information is indicated by a main information block (MIB).

As a possible design, the first indication information is indicated by information carried in a physical broadcast channel (PBCH).

As a possible design, the first indication information is indicated by a demodulation reference signal (DMRS) sequence of the PBCH.

As a possible design, the first indication information is indicated by a system information block (SIB).

As a possible design, the first indication information is indicated by a radio resource control (RRC) message.

For the beneficial effects achieved by the terminal device provided in the foregoing third aspect and the possible implementations thereof, it can refer to the beneficial effects achieved by the foregoing first aspect and the possible implementations thereof, which will not be repeated here.

For the beneficial effects achieved by the network device provided in the foregoing fourth aspect and the possible implementations thereof, it can refer to the beneficial effects achieved by the foregoing second aspect and the possible implementations thereof, which will not be repeated here.

According to a fifth aspect of the embodiments of the present application, there is provided a terminal device including a processor, a memory, a receiver, and a transmitter, where the receiver and the transmitter are both coupled to the processor, and the processor controls a receiving action of the receiver and a sending action of the transmitter, wherein the memory is used for storing computer executable program codes including instructions that, when being executed by the processor, cause the terminal device to perform the method provided in the first aspect or the possible implementations thereof.

According to a sixth aspect of the embodiments of the present application, there is provided a network device including a processor, a memory, a receiver, and a transmitter, where the receiver and the transmitter are both coupled to the processor, and the processor controls a receiving action of the receiver and a sending action of the transmitter, wherein the memory is used for storing computer executable program codes including instructions that, when being executed by the processor, cause the network device to perform the method provided in the second aspect or the possible implementations thereof.

According to a seventh aspect of the embodiments of the present application, there is provided a communication device including a unit, module, or circuit for performing the method provided in the foregoing first aspect or the possible implementations thereof. The communication device may be a terminal device or a module applied to the terminal device. For example, it may be a chip applied to the terminal device.

According to an eighth aspect of the embodiments of the present application, there is provided a communication device including a unit, module, or circuit for performing the method provided in the foregoing second aspect or the possible implementations thereof. The communication device may be a network device or a module applied to the network device. For example, it may be a chip applied to the network device.

According to a ninth aspect of the embodiments of the present application, there is provided a computer program product including instructions which, when run on a computer, cause the computer to perform the method in the foregoing first aspect or various possible implementations thereof.

According to a tenth aspect of the embodiments of the present application, there is provided a computer program product including instructions which, when run on a computer, cause the computer to perform the method in the foregoing second aspect or various possible implementations thereof.

According to an eleventh aspect of the embodiments of the present application, there is provided a computer-readable storage medium having stored therein instructions which, when run on a computer, cause the computer to perform the method in the first aspect or various possible implementations thereof.

According to an twelfth aspect of the embodiments of the present application, there is provided a computer-readable storage medium having stored therein instructions which, when run on a computer, cause the computer to perform the method in the second aspect or various possible implementations thereof.

According to a thirteenth aspect of the embodiments of the present application, there is provided a communication device having stored thereon a computer program which when being executed by the communication device, carries out the method in the foregoing first aspect or various possible implementations thereof. The communication device referred to herein may be, for example, a chip.

According to a fourteenth aspect of the embodiments of the present application, there is provided a communication device having stored thereon a computer program which when being executed by the communication device, carries out the method in the foregoing second aspect or various possible implementations thereof. The communication device referred to herein may be, for example, a chip.

According to a fifteenth aspect of the embodiments of the present application, there is provided a communication device which can be the terminal device in the foregoing third aspect or various possible implementations thereof, or a chip arranged in the terminal device. The communication device includes a processor which is coupled with a memory and can be configured to execute instructions in the memory to carry out the method in the foregoing first aspect or various possible implementations thereof. In some embodiments, the communication device further includes the memory. In some embodiments, the communication device further includes a communication interface with which the processor is coupled.

When the communication device is the terminal device, the communication interface may be a transceiver, or an input/output interface.

When the communication device is the chip arranged in the terminal device, the communication interface may be an input/output interface.

In some embodiments, the transceiver may be a transceiver circuit. In some embodiments, the input/output interface may be an input/output circuit.

According to a sixteenth aspect of the embodiments of the present application, there is provided a communication device which can be the network device in the foregoing fourth aspect or various possible implementations thereof, or a chip arranged in the network device. The communication device includes a processor which is coupled with a memory and which can be configured to execute instructions in the memory to carry out the method in the foregoing second aspect or various possible implementations thereof. In some embodiments, the communication device further includes the memory. In some embodiments, the communication device further includes a communication interface with which the processor is coupled.

When the communication device is the network device, the communication interface may be a transceiver, or an input/output interface.

When the communication device is the chip arranged in the network device, the communication interface may be an input/output interface.

In some embodiments, the transceiver may be a transceiver circuit. In some embodiments, the input/output interface may be an input/output circuit.

According to a seventeenth aspect of the embodiments of the present application, there is provided a communication system, including: a network device and a terminal device. The terminal device is configured to perform the method in the foregoing first aspect or various possible implementations thereof. The network device is configured to perform the method in the foregoing second aspect or various possible implementations thereof.

According to an eighteenth aspect of the embodiments of the present application, there is provided a chip which is connected to a memory and is configured to read and execute a software program stored in the memory to carry out the method provided in any of the first to second aspects or any possible implementations of any of the aspects.

According to a nineteenth aspect of the embodiments of the present application, there is provided a chip including a processor and a memory, and the processor is configured to read a software program stored in the memory to carry out the method provided in any of the first to second aspects or any possible implementation of any of the aspects.

DETAILED DESCRIPTION

Figure 1:
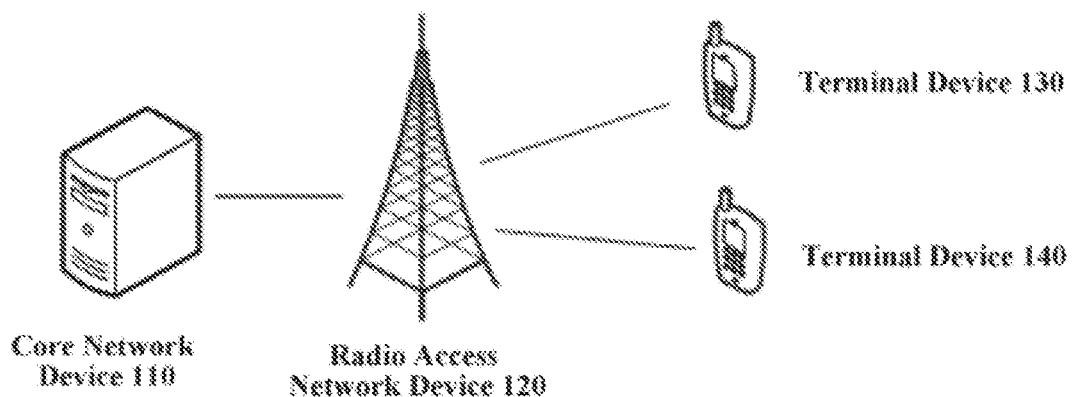
FIG. 1 is a schematic diagram of an architecture of a mobile communication system to which embodiments of the present application are applied.

FIG. 1 is a schematic diagram of an architecture of a mobile communication system to which the embodiments of the present application are applied. As shown in FIG. 1, the mobile communication system may include a core network device 110, a radio access network device 120, and at least one terminal device (a terminal device 130 and a terminal device 140 as shown in FIG. 1). The terminal device is connected to the radio access network device 120 in a wireless manner, and the radio access network device 120 is connected to the core network device 110 in a wireless or wired manner. The core network device 110 and the radio access network device 120 can be separate and different physical devices, or functions of the core network device 110 and logical functions of the radio access network device 120 can be integrated on a same physical device, and it is also possible to integrate part of the functions of the core network device 110 and part of functions of the radio access network device 120 on a single physical device. The terminal device can be fixed in location or be movable. FIG. 1 is only a schematic diagram, and the mobile communication system may also include other network devices, such as a wireless relay device and a wireless backhaul device, which are not shown in FIG. 1. The number of the core network devices 110, the radio access network devices 120 or the terminal devices included in the mobile communication system is not limited in the embodiments of the present application.

The radio access network device 120 is an access device for a terminal devices to access the mobile communication system in a wireless manner, which can be a node base (NodeB), an evolved node base (eNodeB), a node base in a 5G mobile communication system or a new radio (NR) communication, a node base in a future mobile communication system, a access node in a Wi-Fi system, etc., and the specific technologies and forms of the device adopted in the radio access network device 120 are not limited in the embodiments of the present application. In the embodiments of the present application, the radio access network device 120 is referred to as a network device. Unless otherwise specified, in the embodiments of the present application, the network device refers to the radio access network device 120. In addition, the terms 5G and NR can be equivalently used in the embodiments of the present application.

The terminal device may also be referred to as a terminal, user equipment (UE), a mobile station (MS), a mobile terminal (MT) or the like. The terminal device can be a mobile phone, a tablet, a computer with a wireless transceiving function, a virtual reality (VR) terminal device, an augmented reality (AR) terminal device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, etc.

The radio access network device 120 and the terminal device can be deployed on land, including indoor or outdoor, handheld or vehicle-mounted, can be deployed on water, or be deployed on an airplane, a balloon or a satellite in the air. The application scenarios of the radio access network device 120 and the terminal device are not limited in the embodiments of the present application.

The radio access network device 120 and the terminal device can communicate with each other through a licensed spectrum or an unlicensed spectrum, or communicate with each other through both the licensed spectrum and the unlicensed spectrum. The radio access network device 120 and the terminal device can communicate with each other through the spectrum below 6 gigahertz (GHz) or the spectrum above 6 GHz, or communicate with each other by using both the spectrum below 6 GHz and the spectrum above 6 GHz. The spectrum resources used in the communication between the radio access network device 120 and the terminal device are not limited in the embodiments of the present application.

To facilitate understanding of the embodiments of the present application by those skilled in the art, the terms involved in the embodiments of the present application are firstly explained below.

1. SSB

The SSB includes a synchronization signal (SS) and a physical broadcast channel (PBCH), where the SS includes a primary synchronization signal (PSS) and a secondary synchronization signal (SSS).

Figure 2:
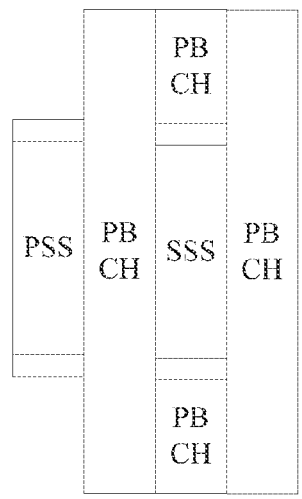
FIG. 2 is a diagram of an exemplary structure of a SSB.

FIG. 2 is a diagram of an exemplary structure of the SSB. As shown in FIG. 2, PSS, SSS and PBCH are packaged together into one SSB for transmission.

2. QCL

When two SSBs are QCL, it can be considered that large-scale parameters of the two SSBs can be inferred from each other, or be similar to each other. The large-scale parameters may include a Doppler delay, an average delay, a spatial reception parameter, and so on.

Exemplarily, in the NR system, in a scenario where measurement is performed through SSB, the network device sends multiple SSBs to the terminal device in a certain period. When the terminal device performs the measurement, it identifies which of the SSBs are QCL according to SSB numbers, and performs filtering on the QCL SSBs as a measurement result of a beam level.

Taking the mobile communication system shown in FIG. 1 as an NR system as an example, when the NR system works in the licensed spectrum, the network device sends the SSBs in a certain period. In the SSB transmission period, the transmission position of each SSB is fixed. For each position for the SSB transmission, a number can be assigned to the SSB transmitted at this position, and the number is sequentially numbered according to the order of the positions where the SSBs are transmitted. For example, assuming that the network device sends a quantity L of the SSBs in the period where L is an integer greater than or equal to 1, the SSBs in each period are sequentially numbered from 0 to L−1. On the one hand, the number can reflect the transmission position of the SSB in the SSB transmission period. For example, if the number of the SSB is 0, it indicates that the SSB is sent at a first position in the transmission period. On the other hand, the number can also reflect the QCL relationship between the SSBs. Specifically, the SSBs in the same antenna transmission direction are sent at positions with the same number. After the terminal device receives the SSBs, if it determines that the numbers of two SSBs are the same, it can be considered that the two SSBs are QCL.

With the rapid development of wireless communication technologies, spectrum resources are increasingly scarce. In order to solve the problem of less available resources in the licensed spectrum, the NR system may not rely on the licensed spectrum, and completely work on the unlicensed spectrum. An NR system working on the unlicensed spectrum can be called an NR-U system.

In the unlicensed spectrum where the NR-U system works, channel resources are shared, and in order to use the unlicensed spectrum with other systems, such as a communication systems of a different operator, a Wi-Fi network, etc., the transmission device in the NR-U system can use a channel access mechanism of listen before talk (LBT) to use the channel resources of the unlicensed spectrum. Specifically, prior to performing transmission, the transmission device first performs channel listening on the channel, and when it is determined through the channel listening that the channel is idle, that is, when the channel listening is successful or the LBT is successful, the transmission device can obtain right to use the channel, and then perform transmission on the channel for which the use right is obtained. It is to be noted that the transmission device here can be a network device or a terminal device. If the device that initiates LBT is the network device, the transmission device is the network device and the receiving device is the terminal device, and if the device that initiates LBT is the terminal device, the transmission device is the terminal device and the receiving device is the network device. Since it is necessary for the transmitting device to obtain the channel use right through LBT prior to performing the transmission, it is difficult to guarantee that the SSBs can be sent at the fixed positions in each SSB transmission period. Therefore, it is no longer possible to determine the QCL relationship of the SSBs by directly comparing the SSB numbers. For example, in the NR system, the SSBs in the same antenna transmission direction are always sent at the first position of each period, and these SSBs have the number 0 corresponding to the first position so that the terminal device can determine that these SSBs are QCL directly according to the numbers of these SSB. In the NR-U system, however, in a first period, an SSB with an antenna transmission direction 1 is sent at the first position, and the number of this SSB is the number 0 corresponding to this position, and in a second period, the network device successfully obtains an available channel through LBT at the position of number 1 and thus in the second period, the network device cannot continue to use the position of number 0 to transmit the SSB with the antenna transmission direction 1 but can only use the available channel position (e.g., a position of number 2) to transmit the SSB with the antenna direction 1, that is, the SSBs of the same antenna transmission direction 1 (that is, the two SSBs which are QCL) are not transmitted at the position of the same number. Therefore, when receiving the SSBs sent in the two periods, the terminal device cannot directly use the SSB numbers to determine whether the SSBs are QCL.

In view of the above problems, in the embodiments of the present application, there is proposed a synchronization signal block information processing in which after receiving SSBs, the terminal device can determine the QCL relationship between the SSBs according to identifiers of the SSBs and first indication information. With this method, it cannot only guarantee that the QCL relationship between the SSBs can be obtained accurately by the terminal device, but also effectively use the channel resources between a start position of the channel occupation and a start position of the SSB transmission, thereby ensuring the utilization efficiency of system resources in the unlicensed spectrum.

It is to be noted that the methods provided in the embodiments of the present application can be applied to the above-mentioned NR-U system, but are not limited thereto, and can also be applied to other communication systems as long as there is an entity that needs to send the SSB and another entity that needs to confirm the QCL relationship of the SSBs in the mobile communication system. That is to say, the methods used in the embodiments of the present application can be applied to any mobile communication system that needs to confirm the QCL SSBs, including a mobile communication system that works in the licensed spectrum (such as a NR system, etc.), a mobile communication system that relies on assistance of the licensed spectrum (such as a LTE-A system, a LAA system, etc.), and other mobile communication systems that work completely on the unlicensed spectrum (such as a LTE-U system, a Wi-Fi system, a V2X system, etc.), for example.

The technical solutions according to the embodiments of the present application will be described in detail below in conjunction with specific embodiments. The following specific embodiments can be combined with each other, and the same or similar concepts or processes may not be repeated in some embodiments.

Figure 3:
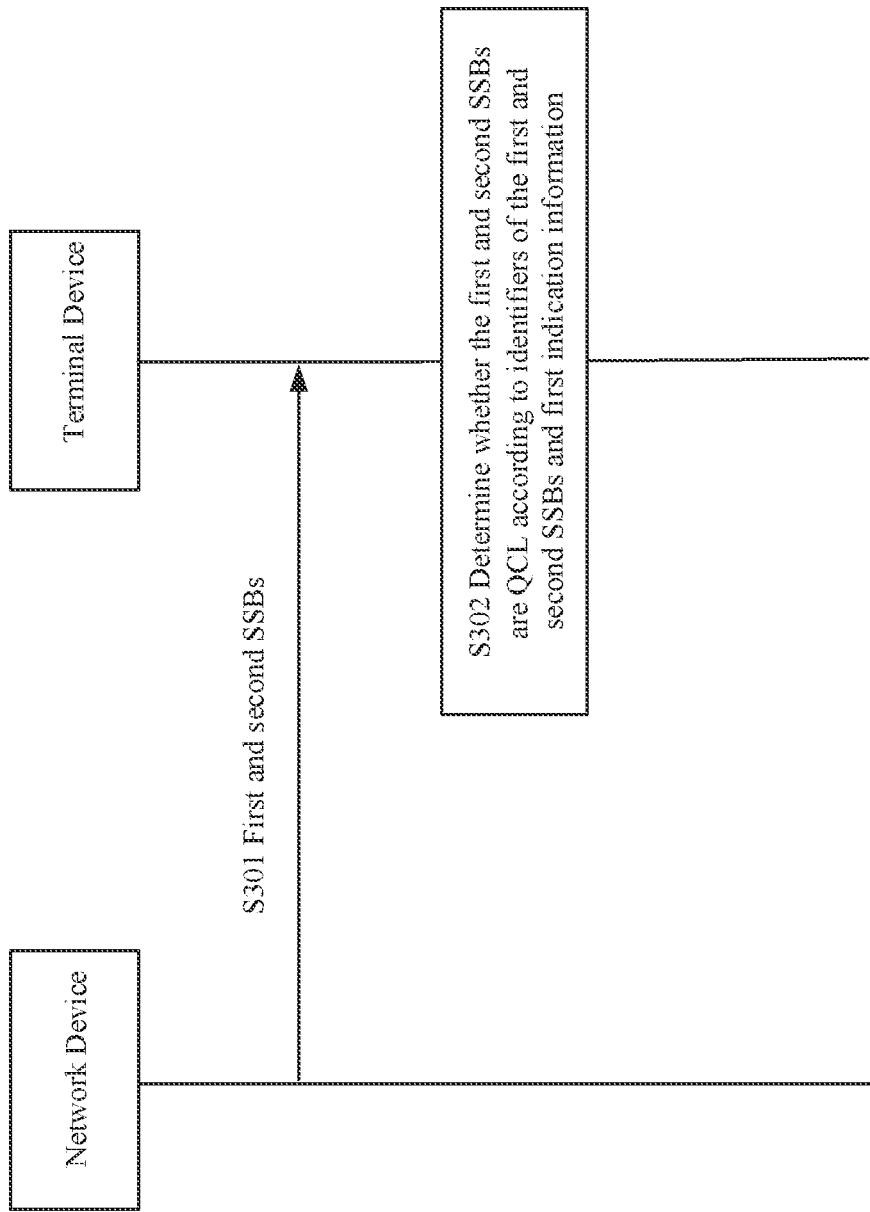
FIG. 3 is a schematic flowchart of a synchronization signal block information processing method according to an embodiment of the application.

FIG. 3 is a schematic flowchart of a synchronization signal block information processing method according to an embodiment of the application. As shown in FIG. 3, the method includes the following steps.

In S301, a network device sends a first SSB and a second SSB to a terminal device.

In some embodiments, the network device can send the SSBs in a certain period. Exemplarily, in the NR system, the protocol specifies an upper limit of the number of the SSBs that can be sent in one period in different spectrums. For example, in the spectrum below 6 GHz, a maximum number of 8 SSBs are permitted to be sent in one period, and in the spectrum above 6 GHz, up to 64 SSBs are permitted to be sent in one period. In the premise of complying with such restriction, the network device can flexibly select the number of the SSBs sent in the period as needed. For example, when working in the spectrum below 6 GHz, the network device can actually send 4 SSBs in one period.

In the embodiments of the present application, the first SSB and the second SSB may be two SSBs in different periods, or two SSBs in the same period, which is not particularly limited in the embodiments of the present application. Correspondingly, the two SSBs that are QCL with each other can be sent in different periods or in the same period.

After receiving the SSB, the terminal device can obtain an identifier of the SSB, which indicates a transmission position of the SSB within a certain period of time. In some embodiments, the identifier of the SSB may be an SSB number. The SSB number represents the transmission position of the SSB within the certain period of time. Exemplarily, if the SSB number is 0, it means that the SSB is transmitted at a position numbered 0.

The certain period of time mentioned above may refer to the foregoing transmission period or a period of time within the foregoing transmission period. As an optional implementation, in the transmission period, the network device may restrict all the SSBs to be sent within half of a frame. Therefore, optionally, the certain period of time mentioned above may refer to half of the frame. In other examples, the certain period of time mentioned above may also be 2 ms, 4 ms, or 8 ms.

After receiving the SSB, the terminal device may obtain the identifier of the SSB in any of the following manners, which is not particularly limited in the embodiments of the present application.

In a first manner, the terminal device determines the identifiers of different SSBs by detecting demodulation reference signal (DMRS) sequences of different physical broadcast channels (PBCHs).

In a second manner, the terminal device determines the identifiers of different SSBs through information carried in the PBCHs.

In a third manner, the terminal device determines the identifiers of the SSBs by both detecting the DMRS sequences of the different PBCHs and using the information carried in the PBCHs.

In S302, the terminal device determines whether the first SSB and the second SSB are QCL according to the identifiers of the first and second SSBs, and the first indication information.

In an optional implementation, the first indication information is used for indicating a first quantity which is related to a number of the SSBs sent by the network device within a set period of time.

The network device can send the SSBs based on the first quantity indicated by the first indication information. Exemplarily, assuming that the first quantity indicated by the first indication information is 4, if the network device first transmits one SSB at a position of number 0, the SSBs that have the QCL relationship with this SSB can only be transmitted on the positions of number 0, number 4, number 8, number 12, number 16, etc. That is, results of these position numbers mod 4 are the same.

The first indication information may be information specified by the protocol or information obtained by negotiation between the network device and the terminal device in advance, or the first indication information may also be information indicated by the network device to the terminal device, which is not particularly limited in the embodiments of the present application.

After obtaining the first indication information, the terminal device may directly obtain the first quantity from the first indication information, or obtain the first quantity through a certain calculating process.

After obtaining the first quantity, the terminal device can determine whether the first SSB and the second SSB are QCL according to the identifier of the first SSB, the identifier of the second SSB, and the first quantity.

In some embodiments, the terminal calculates a result of a SSB number of the first SSB mod the first quantity, and calculates the result of the SSB number of the second SSB mod the first quantity, and determines whether the two modulo results are equal, and if they are equal, it determines that the first SSB and the second SSB are QCL. That is, if the result of the SSB number of the first SSB mod the first quantity is equal to result of the SSB number of the second SSB mod the first quantity, the first SSB and the second SSB are QCL.

The method provided in the embodiments of the present application is exemplarily explained below by way of example.

Figure 4:
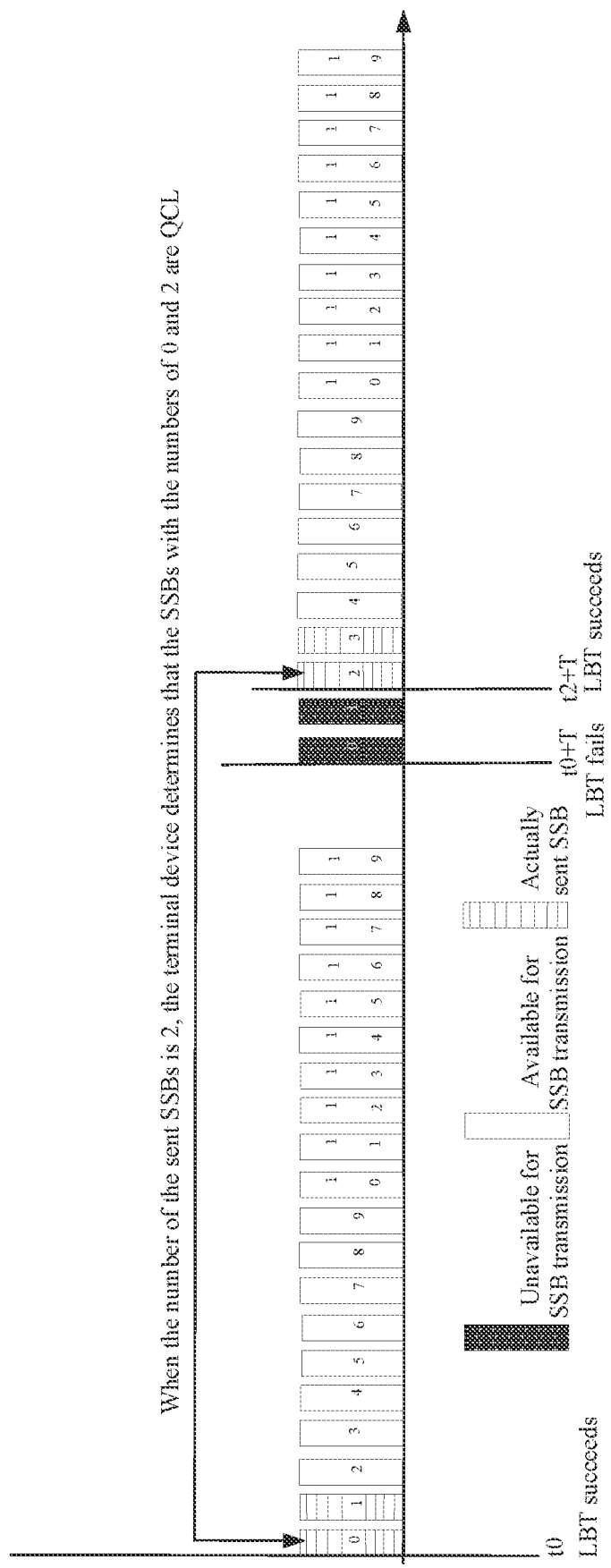
FIG. 4 is a diagram of an example of SSB transmission in an unlicensed spectrum.

FIG. 4 is a diagram of an example of the SSB transmission in the unlicensed spectrum. As shown in FIG. 4, the SSB transmission period is T. Assuming that the number of the SSBs actually sent by the network device in each period is 2, the network device uses the quantity of 2 as the first indication information to indicate to the terminal device. In each period, there are 20 information transmission positions, numbered from 0 to 19. In the period starting from t0 (assumed to be the first period), all positions numbered 0-19 can be used for the SSB transmission. Therefore, the network device can send the SSB at the position numbered 0. In the period starting from t0+T (assumed to be the second period), the positions available for the SSB transmission obtained by the network device through the LBT are the positions numbered 2 to 19. As such, the SSB which has the QCL relationship with the SSB sent in the first period cannot be sent by using the same position numbered 0 as in the first period. Based on the quantity of 2 indicated by the first indication information, the network device may select the position numbered 2 (that is, number of 0 plus 2) to send this SSB in the second period. When receiving the SSB in the first period and the SSB in the second period, the terminal device obtains the SSB number of the SSB in the first period, that is, number 0, and the SSB number of the SSB in the second period, that is, number 2, and perform an operation of the number 0 mod the quantity of 2 indicated by the first indication information and the operation of the number 2 mod the quantity of 2, and thus obtains the same modulo result. Therefore, the terminal device can determine that the two SSBs in the first period and the second period are QCL. Accordingly, although the two SSBs in the first period and the second period are not sent at the same numbered position, that is, the two SSBs do not have the same SSB number, since the first indication information is introduced in the embodiments of the present application, the network device can send the SSBs at specific positions according to the first quantity indicated by the first indication information. Accordingly, the terminal device can still accurately determine whether the SSBs are QCL through the first quantity indicated by the first indication information and the identifiers of the SSBs. Therefore, with the method in the embodiments of the present application, it can ensure that the terminal device accurately obtains the QCL relationship between the SSBs. At the same time, the channel resources between the start position of the channel occupation and the start position of the SSB transmission can be further effectively used as long as the first indication information is appropriately set, and the utilization efficiency of system resources in the unlicensed spectrum can be ensured. For example, in the example of FIG. 4, if the quantity determined by the first indication information is 8, the SSB in the second period can be sent only from the position numbered 8 so as to ensure that the terminal device can accurately determine the two SSBs in the first and second periods are QCL. As such, the positions numbered 2,3,4,5,6 and 7 between the start position 8 of the channel occupation and the start position 2 available for the SSB transmission cannot be used for the SSB transmission, resulting in a waste in the channel resources. If the quantity indicated by the first indication information is 2, the SSB in the second period can be sent from the position numbered 2, which can ensure that the terminal device can accurately determine that the two SSBs in the first and second periods are QCL, and at this time, there is no waste of the channel resources.

In the present embodiment, the network device sends the SSBs at specific positions according to the first indication information. After receiving the SSB, the terminal device can determine the QCL relationship between the SSBs according to the identifiers of the SSBs and the first indication information. With this method, it cannot only ensure that the terminal device accurately obtains the QCL relationship between the SSBs, but also effectively use the channel resources between the start position of the channel occupation and the start position available for the SSB transmission, and thus ensure the utilization efficiency of the system resources in the unlicensed spectrum.

Figure 5:
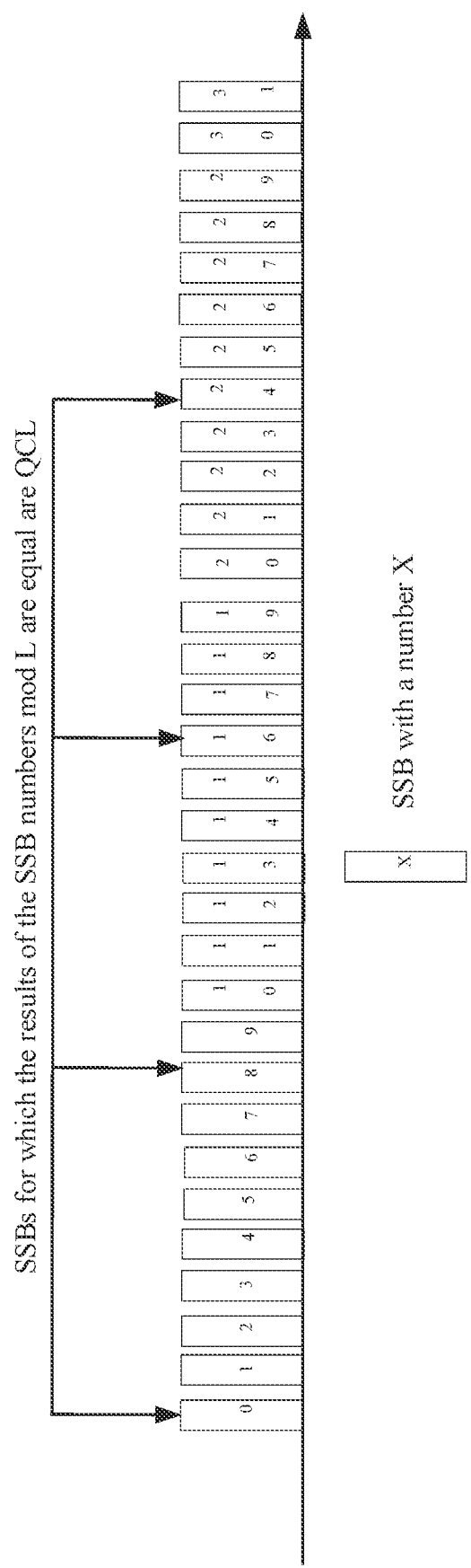
FIG. 5 is an exemplary diagram of transmission positions of SSBs with a QCL relationship.

As mentioned earlier, in the NR system, the protocol specifies the upper limit of the number of SSBs that can be sent in one period in different spectrums, which is assumed to be L. As a possible design, the first indication information may be information indicating L, that is, the first quantity indicated by the first indication information is L. An example of the transmission positions of the SSBs having the QCL relationship with each other is as shown in FIG. 5. Referring to FIG. 5, assuming that the NR-U system works below 6 GHz and L is equal to 8, for example, the SSBs which are transmitted at the positions numbered 0, 8, 16 and 24 are QCL, and the result of each of these position numbers mod 8 is equal to each other. For another example, if L is equal to 4, the SSBs sent at the positions numbered 0, 4, 8, 12, 16, 20, and 24 are QCL, and the result of each of these position numbers mod 4 is equal to each other.

In addition, the first quantity indicated by the first indication information may also be related to the number of the SSBs actually sent by the network device.

There are several possible design manners for first indication information as following.

In a first manner, the first indication information includes the number of the SSBs actually sent by the network device, and the first quantity is the number of the SSBs actually sent by the network device.

In this manner, the first quantity is equal to the number of the SSBs actually sent by the network device.

Taking the manner in which the first indication information is indicated by the network device to the terminal device as an example, the network device can directly send the number of the SSBs actually sent by the network device to the terminal device as the first indication information. After receiving the first indication information, the terminal device can be aware of that the first quantity is the number of the sent SSBs, and can determine the QCL relationship of the SSBs based on the number of the sent SSBs by using the method as described above. Exemplarily, the network device sends the number 4 of the SSBs that are actually sent, as the first indication information, to the terminal device, and after receiving and determining the first indication information, that is, the number of 4, the terminal device can determine that the first quantity used for determining the QCL relationship of the SSBs is 4.

In a second manner, the first indication information includes a numerical value n, and the first quantity is obtained by rounding up the number of the SSBs actually sent by the network device up to nth power of 2, where n is an integer greater than or equal to 0.

The following are several examples of the first quantity obtained in the second manner.

In a first example, assuming that the number of the SSBs actually sent by the network device is 1, the first quantity is the result obtained by rounding up 1 up to the nth power of 2, and the first quantity may be 1, 2, 4, or 8. Therefore, the network device can indicate that the first quantity is one of 1, 2, 4, and 8 through the first indication information. Accordingly, the terminal device determines through the first indication information that the first quantity is the one of 1, 2, 4, and 8.

In a second example, assuming that the number of the SSBs actually sent by the network device is 2, the first quantity is the result obtained by rounding up 2 up to the nth power of 2, and the first quantity may be 2, 4, or 8. Therefore, the network device can indicate that the first quantity is one of 2, 4, and 8 through the first indication information. Accordingly, the terminal device determines through the first indication information that the first quantity is the one of 2, 4, and 8.

In a third example, assuming that the number of the SSBs actually sent by the network device is 3, the first quantity is the result obtained by rounding up 3 up to the nth power of 2, and the first quantity may be 4 or 8. Therefore, the network device can indicate that the first quantity is one of 4 and 8 through the first indication information. Accordingly, the terminal device determines through the first indication information that the first quantity is the one of 4 and 8.

In a fourth example, assuming that the number of the SSBs actually sent by the network device is 4, the first quantity is the result obtained by rounding up 4 up to the nth power of 2, and the first quantity may be 4 or 8. Therefore, the network device can indicate that the first quantity is one of 4 and 8 through the first indication information. Accordingly, the terminal device determines through the first indication information that the first quantity is the one of 4 and 8.

In a fifth example, assuming that the number of the SSBs actually sent by the network device is 5, the first quantity is the result obtained by rounding up 5 up to the nth power of 2, and the first quantity may be 8. Therefore, the network device can indicate that the first quantity is 8 through the first indication information. Accordingly, the terminal device determines through the first indication information that the first quantity is 8.

In a sixth example, assuming that the number of the SSBs actually sent by the network device is 6, the first quantity is the result obtained by rounding up 6 up to the nth power of 2, and the first quantity may be 8. Therefore, the network device can indicate that the first quantity is 8 through the first indication information. Accordingly, the terminal device determines through the first indication information that the first quantity is 8.

In a seventh example, assuming that the number of the SSBs actually sent by the network device is 7, the first quantity is the result obtained by rounding up 7 up to the nth power of 2, and the first quantity may be 8. Therefore, the network device can indicate that the first quantity is 8 through the first indication information. Accordingly, the terminal device determines through the first indication information that the first quantity is 8.

In an eighth example, assuming that the number of the SSBs actually sent by the network device is 8, the first quantity is the result obtained by rounding up 8 up to the nth power of 2, and the first quantity may be 8. Therefore, the network device can indicate that the first quantity is 8 through the first indication information. Accordingly, the terminal device determines through the first indication information that the first quantity is 8.

Take the manner in which the first indication information is indicated by the network device to the terminal device as an example. In this manner, the first indication information indicated by the network device to the terminal device is the numerical value n. After receiving and determining the numerical value n, the terminal device calculates the result of the nth power of 2 and uses this calculation result as the first quantity so as to determine the QCL relationship of the SSBs.

Exemplarily, assuming that the number of the SSBs actually sent by the network device is 8, n may be 3, that is, the above-mentioned first indication information is the numerical value of 3. After receiving the first indication information, that is, the numerical value of 3, the terminal device calculates the cube of 2 to obtain the result of 8, and thus it can determine that the first quantity is 8.

In this manner, fewer resources can be used to represent the first indication information. For example, in the above example of representing the first quantity of 8, it only needs 2 bits (the first indication information is 3, which occupies 2 bits) in this manner, whereas 3 bits are required in the first manner above (the first indication information is 8, occupying 3 bits).

In a third manner, the first indication information includes m, and the first quantity is obtained by rounding up the number of the SSBs actually sent by the network device up to 2 m, where m is an integer greater than or equal to 1.

Take the manner in which the first indication information is indicated by the network device to the terminal device as an example. In this manner, the first indication information indicated by the network device to the terminal device is the numerical value m. After receiving and determining the numerical value m, the terminal device calculates a product of m and 2 and uses this product as the first quantity so as to determine the QCL relationship of the SSBs.

Exemplarily, assuming that the number of the SSBs actually sent by the network device is 8, in may be 4, that is, the above-mentioned first indication information is the numerical value of 4. After receiving the first indication information, that is, the numerical value of 4, the terminal device calculates the product of 2 and 4 to obtain the result of 8, and thus it can determine that the first quantity is 8.

In this manner, still, fewer resources can be used to represent the first indication information. For example, in the above example of representing the first quantity of 8, it only needs 2 bits (the first indication information is 4, which occupies 2 bits) in this manner, whereas 3 bits are required in the first manner above (the first indication information is 8, occupying 3 bits).

As mentioned above, the first indication information may be the information specified by the protocol, the information obtained by the negotiation between the network device and the terminal device in advance, or the information indicated by the network device to the terminal device.

As for the first manner, the first indication information is fixed information, which can be directly used by the terminal device, and thus it will not be repeated here.

As for the second manner, the network device can interact with the terminal device by using a specific message to negotiate the first indication information. Exemplarily, the network device first sends the first indication information to be selected to the terminal device, the terminal device judges the first indication information and returns to the network device response information in which information regarding whether to agree to use the first indication Information or not is carried. The method for the network device to send the first indication information to be selected to the terminal device may be the same as that for indicating the first indication information in the third manner below, and reference can be made to the process in the third manner below.

As for the third manner, the network device indicates the first indication information to the terminal device, and the terminal device receives and saves the first indication information, and uses the first quantity indicated by the first indication information to determine the QCL relationship of the SSBs after receiving the SSBs.

In some embodiments, the network device may indicate the first indication information in any of the following ways.

1. Indicating Through a Master Information Block (MIB)

In the NR system and the NR-U system, the network device continuously broadcast a system message repeatedly, and the broadcast system message includes a MIB message and a system information block (SIB) message which is described below. The MIB message is transmitted in a physical broadcast channel (PBCH), and the SIB message is transmitted in a physical downlink shared channel. In order to access the cell normally, the terminal device needs to read the system message.

In this manner, the first indication information is carried in the MIB message which is broadcast by the network device. In an exemplary scenario, when the terminal device performs an initial access, after receiving the MIB message broadcast by the network device, the terminal device can further determine the first quantity by reading the first indication information carried in the MIB message, and use the first quantity in subsequent determination of the QCL relationship.

In an example, the network device may use a cell parameter of a specific format in the MIB to carry the first indication information, and the terminal device parses the MIB in accordance with the specific format so as to read the first indication information.

In an example where the first indication information is in the first design manner mentioned above, that is, the first indication information includes the number of the SSBs actually sent by the network device, and the first quantity is the number of the SSBs actually sent by the network device, an exemplary structure of the MIB message is as follows.

```
MIB ::=         SEQUENCE {
    ...
    ssb-Num     INTEGER (1..Kmax),
    ...
}
``` where ssb-Num represents the first indication information; (1 . . . Kmax) represents a value range of the first indication information, and Kmax represents a maximum value of the first quantity.

When the first indication information is in the second design manner as described above, that is, when the first quantity indicated by the first indication information is a certain integer determined from the nth power of 2, an exemplary structure of the MIB message is as follows.

```
MIB ::=         SEQUENCE {
    ...
    ssb-Num     INTEGER (1..Kmax),
    ...
}
``` where ssb-Num represents the first indication information; (1 . . . Kmax) represents a value range of the first indication information, and Kmax represents a maximum value of the first quantity.

2. Indicating Through Information Carried by PBCH

Part of the information of the PBCH is generated by a physical layer of the network device, and the other part of the information is generated by a higher layer of the network device. The information carried by the PBCH refers to the information generated by the physical layer of the network device.

In this manner, the physical layer of the network device may use a certain number of bits in the information carried by the PBCH to carry the first indication information. Exemplarily, when the first indication information includes the number of the SSBs actually sent by the network device, that is, the first indication information directly indicates the first quantity, the physical layer of the network device generates information of N bits in the information carried by the PBCH, N is an integer greater than 0 and the N bits are a1 to aN, and t can indicate the first quantity.

In an example, if the first indication information is in the first design manner as described above, that is, the first indication information includes the number of the SSBs actually sent by the network device, and the first quantity is the number of the SSBs actually sent by the network device, assuming that N is 3, 3 bits can have a range of values from 000 to 111, and each of these values corresponds to a value from 1 to 8. If the 3-bit information carried in the PBCH information carried by the physical layer of the network device is 111, it indicates that the first quantity indicated by the network device is 8.

In another example, if the first indication information is in the second design manner as described above, that is, the first indication information includes the numerical value n, and the first quantity is the number obtained by rounding up the number of the SSBs actually sent by the network device up to the nth power of 2, assuming N is 2, 2 bits can have a range of values from 00 to 11, and each of the values corresponds to a value from 0 to 3. If the 2-bit information carried in the PBCH information carried by the physical layer of the network device is 11, it indicates that n is equal to 3. The terminal device then calculates the result of the cube of 2, which is 8, that is, the terminal device determines that the first quantity is 8.

In still another example, if the first indication information is in the third design manner as described above, that is, the first indication information includes the numerical value m, and the first quantity is the number obtained by rounding up the number of the SSBs actually sent by the network device up to 2 m, assuming N is 2, 2 bits can have a range of values from 00 to 11, and each of the values corresponds to a value from 0 to 3. If the 2-bit information carried in the PBCH information carried by the physical layer of the network device is 10, it indicates that n is equal to 3. The terminal device then calculates the product of 2 and 3, which is 6, that is, the terminal device determines that the first quantity is 6.

3. Indicating Through a DeModulation Reference Signal (DMRS) Sequence of PBCH

The DMRS sequence of the PBCH is generated by the higher layer of the network device. The higher layer of the network device can generate different DMRS sequences, and the network device can indicate different first indication information through the different DMRS sequences.

In an example, each DMRS of the PBCH represents one piece of first indication information.

For example, the terminal device detects different DMRS sequences of the PBCH, and determines the first indication information based on the detected DMRS sequences. Specifically, content indicated by the first indication information in the DMRS sequences of the PBCH is as follows: the DMRS sequences of the PBCH have Kmax different sequences, and each sequence represents a different piece of first indication information. For example, the DMRS sequences of the PBCH have 4 different sequences, and each sequence represents a different piece of first indication information. Sequence 1 represents that the first indication information is 1, sequence 2 represents that the first indication information is 2, sequence 3 represents that the first indication information is 3, and sequence 4 represents that the first indication information is 4.

In another example, the DMRSs of the PBCH can be divided into different DMRS groups, and each DMRS group represents one piece of first indication information.

For example, the terminal device detects different DMRS sequences of the PBCH, and determines the first indication information based on the detected DMRS sequences. Specifically, content indicated by the first indication information in the DMRS sequences of the PBCH is as follows: the DMRS sequences of the PBCH have Kmax different sequences, and every two sequences represent a different piece of first indication information. For example, the DMRS sequences of the PBCH have 8 different sequences, and every two sequences represent one different piece of first indication information. Sequences 1 and 2 represent that the first indication information is 1, sequences 3 and 4 represent that the first indication information is 2, sequences 5 and 6 represent that the first indication information is 3, and sequences 7 and 8 represent that the first indication information is 4.

4. Indicating Through a System Information Block (SIB)

As mentioned above, the system message broadcast by the network device includes the MIB message and the SIB message.

In an example, the network device may carry one piece of first indication information in the SIB message, and the piece of first indication information may be applied to all cells at the frequency point corresponding to the SIB message, that is, all the cells at this frequency point determine the QCL relationship by using the first quantity indicated by the first indication information carried in the SIB information.

In some embodiments, in this example, the SIB message may be a SIB1 message, SIB2 message, SIB3 message, or SIB4 message.

The SIB1 message is mainly used to describe system information related to cell access and the service of the home cell after the access. It should be understood that when the first indication information is carried by the SIB1 message, the first indication information may be applied to the current cell of the current frequency point corresponding to the SIB1 message.

The information in the SIB2 message can be used for co-frequency cell reselection. It should be understood that when the first indication information is carried in the SIB2 message, the first indication information may be applied to all cells at the frequency point corresponding to the SIB2 message. The information in the SIB3 message is mainly used for co-frequency cell reselection. It should be understood that when the first indication information is carried in the SIB3 message, the first indication information may be applied to all cells at the frequency point corresponding to the SIB3 message.

The information in the SIB4 message is mainly used for inter-frequency cell reselection. It should be understood that when the first indication information is carried in the SIB4 message, the SIB4 message may carry one or more pieces of first indication information, and each piece of first indication information may be applied to all the cells at the corresponding frequency point.

In the following, examples in which the first indication information is carried in the SIB1 message, SIB2 message, SIB3 message and SIB4 message, respectively, are described below.

1. Carrying the First Indication Information in the SIB1 Message

As mentioned above, the SIB1 message is mainly used to describe the system information related to the cell access and the service of the home cell after the access. Accordingly, the first indication information carried in the SIB1 message can be used in the current cell access at the current frequency point and the cell service after the access.

An example of a message structure of the SIB1 message carrying the first indication information is as following.

```
SIB1 ::=            SEQUENCE {
    ...
    ssb-Num                 INTEGER (1..Kmax),
    ...
}
``` where ssb-Num represents the first indication information, (1 ... Kmax) represents a value range of the first indication information, and Kmax represents a maximum value of the first quantity.

2. Carrying the First Indication Information in the SIB2 Message

As mentioned above, the information in the SIB2 message can be used for the co-frequency cell reselection. Accordingly, the first indication information carried in the SIB2 message can be applied to all the cells at the frequency point corresponding to the SIB2 message. An example of the message structure of the SIB2 message carrying the first indication information is as following.

```
SIB2::=             SEQUENCE {
    ...
    ssb-Num                 INTEGER (1..Kmax),
    ...
}
``` where ssb-Num represents the first indication information; (1 ... Kmax) represents a value range of the first indication information, and Kmax represents a maximum value of the first quantity.

Based on this exemplary message structure, the terminal device determines the first quantity according to the ssb-Num parameter after receiving the SIB2 message, and determines whether the SSBs are QCL according to the first quantity.

3. Carrying the First Indication Information in the SIB3 Message

As mentioned above, the information in the SIB3 message is mainly used for the co-frequency cell reselection. Accordingly, the first indication information carried in the SIB3 message can be applied to all the cells at the frequency point corresponding to the SIB3 message. An example of the message structure of the SIB3 message carrying the first indication information is as following.

```
SIB3 ::=            SEQUENCE {
    ...
    ssb-Num                 INTEGER (1..Kmax),
    ...
}
``` where ssb-Num represents the first indication information; (1 ... Kmax) represents a value range of the first indication information, and Kmax represents a maximum value of the first quantity.

Based on this exemplary message structure, the terminal device determines the first quantity according to the ssb-Num parameter after receiving the SIB3 message, and determines whether the SSBs are QCL according to the first quantity.

4. Carrying the First Indication Information in the SIB4 Message

As mentioned above, the information in the SIB4 message is mainly used for the inter-frequency cell reselection. Accordingly, the first indication information carried in the SIB4 message can be applied to all the cells at frequency points corresponding to the SIB4 message. Since the SIB4 message can indicate information of the inter-frequency cell reselection at multiple frequency points, and the first indication information is used for all the cells at each of the frequency points corresponding to the SIB4 message, the first indication information is indication information of a frequency point level in the SIB4 message. An example of the message structure of the SIB4 message carrying the first indication information is as following.

```
SIB4 ::=                    SEQUENCE {
    ...
    interFreqCarrierFreqList    InterFreqCarrierFreqList,
    ...
}
InterFreqCarrierFreqList ::= SEQUENCE (SIZE (1..maxFreq)) OF InterFreqCarrierFreqInfo
```

The above message structure includes one or more InterFreqCarrierFreqInfo, and each InterFreqCarrierFreqInfo represents inter-frequency cell reselection information corresponding to a frequency point. In this example, InterFreqCarrierFreqInfo carries one ssb-Num, which is used for indicating the first indication information of all the cells at this frequency point. An example of the message is as follows.

```
InterFreqCarrierFreqInfo::=    SEQUENCE {
    ...
    ssb-Num                    INTEGER (1..Kmax),
    ...
}
``` where ssb-Num represents the first indication information; (1 ... Kmax) represents a value range of the first indication information, and Kmax represents a maximum value of the first quantity.

Based on this exemplary message structure, the terminal device reads the InterFreqCarrierFreqInfo of each frequency point after receiving the SIB4 message, and then reads the ssb-Num from the InterFreqCarrierFreqInfo, determines the first quantity according to the ssb-Num parameter, and then determines whether the SSBs are QCL according to the first quantity.

In another example, the network device may also carry a first indication information list in the SIB message, the list includes multiple pieces of first indication information, and each piece of first indication information may be applied to one or more cells.

In some embodiments, in this example, the SIB message may be the SIB2 message, SIB3 message, or SIB4 message.

It should be understood that when the first indication information list is carried in the SIB2 message or the SIB3 message, the first indication information list includes one or more pieces of first indication information, and each piece of first indication information may be applied to one cell or to multiple cells.

It should be understood that when the first indication information list is carried in the SIB4 message, the SIB4 message may carry one or more first indication information lists, each of the first indication information lists includes one or more piece of first indication information, and each piece of first indication information may be applied to one cell or to multiple cells.

In the following, examples in which the first indication information list is carried in the SIB2 message, SIB3 message and SIB4, respectively, are described below.

1. Carrying the First Indication Information List in the SIB2 Message

In a first case, the SIB2 message carries one first indication information list, and each piece of first indication information in the first indication information list is applied to one cell. An exemplary message structure in this case is as follows.

```
SIB2 ::=                    SEQUENCE {
    ...
    ssb-Num-list            SEQUENCE (SIZE (1..Cmax)) OF ssb-Num,
    ...
}
wherein
ssb-Num ::=                 SEQUENCE {
    ...
    physCellId              PhysCellId,
    ssb-Num                 INTEGER (1..Kmax),
    ...
}
``` where ssb-Num-list represents the first indication information list which includes one or more ssb-Num structures, and Cmax represents a length of the first indication information list. In the ssb-Num structure, physCellId represents a cell identifier, the ssb-Num parameter represents the first indication information corresponding to the cell identified as physCellId, (1 ... Kmax) represents a value range of the first indication information, and Kmax represents a maximum value of the first quantity.

Based on this exemplary message structure, the terminal device reads the ssb-Num-list parameter after receiving the SIB2 message, and then reads the one or more ssb-Num structures from the ssb-Num-list parameter, reads the ssb-Num parameter corresponding to the cell with the identifier of physCellId from each ssb-Num structure, as the first indication information, determines the first quantity based on the ssb-Num parameter, and determines whether the SSBs with the cell identifier of physCellId are QCL according to the first quantity.

In a second case, the SIB2 message carries one first indication information list, and each piece of first indication information in the first indication information list is applied to multiple cells. An exemplary message structure in this case is as follows:

```
SIB2::=                     SEQUENCE {
    ...
    ssb-Num-list            SEQUENCE (SIZE (1..Qmax)) OF ssb-Num,
    ...
}
```

```
wherein
ssb-Num ::=            SEQUENCE {
    ...
    ssb-Num            INTEGER (1..Kmax),
    Q_physCellId-list  Q_PhysCellId list,
    ...
}
``` where ssb-Num-list represents the first indication information list which includes one or more ssb-Num structures, and Qmax represents a length of the first indication information list. In the ssb-Num structure, the ssb-Num parameter represents the first indication information, (1 . . . Kmax) represents a value range of the first indication information, and Kmax represents the maximum value of the first quantity. The Q_physCellId-list parameter indicates a group of cells to which the ssb-Num parameter in the ssb-Num structure where the Q_physCellId-list parameter is located applies and which includes one or more cells.

Based on this exemplary message structure, the terminal device reads the ssb-Num-list parameter after receiving the SIB2 message, and then reads the one or more ssb-Num structures from the ssb-Num-list parameter, reads the cell list Q_physCellIdlist from each ssb-Num structure, reads the ssb-Num parameter as the first indication information, and determines the first quantity based on the ssb-Num parameter. The cells in the cell list Q_physCellIdlist determine whether the SSBs are QCL according to the first quantity.

2. Carrying the First Indication Information List in the SIB3 Message

In a first case, the SIB3 message carries one first indication information list, and each piece of first indication information in the first indication information list is applied to one cell. An exemplary message structure in this case is as follows.

```
SIB3 ::=               SEQUENCE {
    ...
    ssb-Num-list       SEQUENCE (SIZE (1..Cmax)) OF ssb-Num,
    ...
}
wherein
ssb-Num ::=            SEQUENCE {
    ...
    physCellId         PhysCellId,
    ssb-Num            INTEGER (1..Kmax),
    ...
}
``` where ssb-Num-list represents the first indication information list which includes one or more ssb-Num structures, and Cmax represents a length of the first indication information list. In the ssb-Num structure, physCellId represents a cell identifier, the ssb-Num parameter represents the first indication information corresponding to the cell identified as physCellId, (1 . . . Kmax) represents a value range of the first indication information, and Kmax represents a maximum value of the first quantity.

Based on this exemplary message structure, the terminal device reads the ssb-Num-list parameter after receiving the SIB3 message, and then reads one or more ssb-Num structures from the ssb-Num-list parameter, reads the ssb-Num parameter corresponding to the cell with the identifier of physCellId from each ssb-Num structure, as the first indication information, determines the first quantity based on the ssb-Num parameter, and determines whether the SSBs with the cell identifier of physCellId are QCL according to the first quantity.

In a second case, the SIB3 message carries one first indication information list, and each piece of first indication information in the first indication information list is applied to multiple cells. An exemplary message structure in this case is as follows.

```
SIB3 ::=               SEQUENCE {
    ...
    ssb-Num-list       SEQUENCE (SIZE (1..Qmax)) OF ssb-Num,
    ...
}
wherein
ssb-Num ::=            SEQUENCE {
    ...
    ssb-Num            INTEGER (1..Kmax),
    Q_physCellId-list  Q_PhysCellId list,
    ...
}
``` where ssb-Num-list represents the first indication information list which includes one or more ssb-Num structures, and Qmax represents a length of the first indication information list. In the ssb-Num structure, the ssb-Num parameter represents the first indication information, (1 . . . Kmax) represents a value range of the first indication information, and Kmax represents the maximum value of the first quantity. The Q_physCellId-list parameter indicates a group of cells to which the ssb-Num parameter in the ssb-Num structure where the Q_physCellId-list parameter is located applies and which includes one or more cells.

Based on this exemplary message structure, the terminal device reads the ssb-Num-list parameter after receiving the SIB3 message, and then reads one or more ssb-Num structures from the ssb-Num-list parameter, reads the cell list Q_physCellId-list from each ssb-Num structure, reads the ssb-Num parameter as the first indication information, and determines the first quantity based on the ssb-Num parameter. The cells in the cell list Q_physCellId-list determine whether the SSBs are QCL according to the first quantity.

3. Carrying the First Indication Information List in the SIB4 Message

In a first case, the SIB4 message carries one or more first indication information lists each of which includes one or more pieces of first indication information, and each piece of first indication information can be applied to one cell.

The following is an exemplary message structure in this case.

```
SIB4 ::=                    SEQUENCE {
    ...
    interFreqCarrierFreqList    InterFreqCarrierFreqList,
    ...
}
InterFreqCarrierFreqList ::= SEQUENCE (SIZE (1..maxFreq)) OF InterFreqCarrierFreqInfo
```

The above message structure includes one or more piece of InterFreqCarrierFreqInfo, and each piece of InterFreqCarrierFreqInfo represents inter-frequency cell reselection information corresponding to a frequency point. In this example, the InterFreqCarrierFreqInfo carries one first indication information list. An example of the message is as follows.

```
InterFreqCarrierFreqInfo::=       SEQUENCE {
    ...
    ssb-Num-list        SEQUENCE (SIZE (1..Cmax)) OF ssb-Num,
    ...
}
wherein
ssb-Num ::=       SEQUENCE {
    ...
```

-continued

```
    physCellId        PhysCellId,
    ssb-Num           INTEGER (1..Kmax),
    ...
}
``` where ssb-Num-list represents the first indication information list which includes one or more ssb-Num structures, and Cmax represents a length of a cell list (the first indication information list). In the ssb-Num structure, physCellId represents a cell identifier, the ssb-Num parameter represents the first indication information corresponding to the cell identified as physCellId, (1 . . . Kmax) represents a value range of the first indication information, and Kmax represents a maximum value of the first quantity.

Based on this exemplary message structure, the terminal device reads the InterFreqCarrierFreqInfo of the respective frequency points after receiving the SIB4 message, reads the ssb-Num-list parameter from the InterFreqCarrierFreqInfo, and then reads one or more ssb-Num structures from the ssb-Num-list parameter, reads the ssb-Num parameter corresponding to the cell with the identifier of physCellId from each ssb-Num structure, as the first indication information, determines the first quantity based on the ssb-Num parameter, and determines whether the SSBs with the cell identifier of physCellId are QCL according to the first quantity.

In a second case, the SIB4 message carries one or more first indication information lists each of which includes one or more pieces of first indication information, and each piece of first indication information can be applied to multiple cells.

The following is an exemplary message structure in this case.

```
SIB4 ::=                SEQUENCE {
    ...
    interFreqCarrierFreqList      InterFreqCarrierFreqList,
    ...
}
InterFreqCarrierFregList ::=    SEQUENCE (SIZE (1..maxFreq)) OF InterFreqCarrierFreqInfo
```

The above message structure includes multiple piece of InterFreqCarrierFreqInfo, and each piece of InterFreqCarrierFreqInfo represents inter-frequency cell reselection information corresponding to a frequency point. In this example, the InterFreqCarrierFreqInfo carries one first indication information list. An example of the message is as follows.

```
InterFreqCarrierFreqInfo::=               SEQUENCE {
    ...
    ssb-Num-list            SEQUENCE (SIZE (1..Qmax)) OF ssb-Num,
    ...
}
wherein,
ssb-Num ::=               SEQUENCE {
    ...
    ssb-Num                 INTEGER (1..Kmax),
    Q_physCellId-list       Q_PhysCellId-list,
    ...
}
``` where ssb-Num-list represents the first indication information list which includes one or more ssb-Num structures, and Qmax represents a length of the first indication information list. In the ssb-Num structure, the ssb-Num parameter represents the first indication information, (1 . . . Kmax) represents a value range of the first indication information, and Kmax represents the maximum value of the first quantity. The Q_physCellId-list parameter indicates a group of cells to which the above ssb-Num parameter applies and which includes one or more cells.

Based on this exemplary message structure, the terminal device reads the InterFreqCarrierFreqInfo of the respective frequency points after receiving the SIB4 message, read the ssb-Num-list parameter from the InterFreqCarrierFreqInfo, and then reads one or more ssb-Num structures from the ssb-Num-list parameter, reads the cell list Q_physCellId-list from each ssb-Num structure, reads the ssb-Num parameter as the first indication information, and determines the first quantity based on the ssb-Num parameter. The cells in the cell list Q_physCellId-list determine whether the SSBs are QCL according to the first quantity.

5. Indicating Through a Radio Resource Control (RRC) Message

In an optional manner, the RRC message may be an RRC reconfiguration message, which is used for notifying the terminal device of the first indication information for a certain cell or a cell at a certain frequency point.

In an example, the network device may carry one piece of first indication information in the RRC reconfiguration message, and the piece of first indication information may be applied to all cells at the frequency point corresponding to the RRC reconfiguration message, that is, all the cells at this frequency point determine the QCL relationship by using the first quantity indicated by the first indication information carried in the RRC reconfiguration information.

In this example, the network device may carry the first indication information in the RRC reconfiguration message configured by a measurement object. The following is an example of the RRC reconfiguration message structure.

```
MeasObjectNR ::=        SEQUENCE {
    ...
        ssb-Num         INTEGER (1..Kmax),
    ...
}
``` where ssb-Num represents the first indication information; (1 . . . Kmax) represents a value range of the first indication information, and Kmax represents a maximum value of the first quantity.

In the example where the first indication information is in the first design manner mentioned above, that is, the first indication information includes the number of the SSBs actually sent by the network device and the first quantity is the number of the SSBs actually sent by the network device, an example of the message structure for carrying the first indication information by the network device in the RRC reconfiguration message configured by the measurement object is as follows.

```
MeasObjectNR ::=        SEQUENCE {
    ...
        ssb-Num         INTEGER (1..Kmax),
    ...
}
``` where ssb-Num represents the first indication information; (1 . . . Kmax) represents a value range of the first indication information, and Kmax represents a maximum value of the first quantity.

In the example where the first indication information is in the second design manner mentioned above, that is, the first quantity indicated by the first indication information is an certain integer determined by the nth power of 2, an example of the message structure for carrying the first indication information by the network device in the RRC reconfiguration message configured by the measurement object is as follows.

```
MeasObjectNR ::=        SEQUENCE {
    ...
        ssb-Num         INTEGER (1..Kmax),
    ...
}
``` where ssb-Num represents the first indication information; (1 . . . Kmax) represents a value range of the first indication information, and Kmax represents a maximum value of the first quantity.

In another example, the network device may also carry one first indication information list in the RRC reconfiguration message, the list includes multiple pieces of first indication information, and each piece of first indication information may be applied to one or more cells.

In a first case, the RRC reconfiguration message carries one first indication information list which includes one or more pieces of the first indication information, and each piece of the first indication information may be applied to one cell.

In this case, the MeasObjectNR message in the RRC reconfiguration message carries the first indication information list which includes multiple pieces of first indication information, and each piece of first indication information can be applied to one cell. An example of the message structure for carrying the first indication information by the network device in the RRC reconfiguration message configured by the measurement object is as follows.

```
MeasObjectNR ::=        SEQUENCE {
    ...
        ssb-Num-list    SEQUENCE (SIZE (1..Cmax)) OF
    ...
}
ssb-Num ::=             SEQUENCE {
    ...
        physCellId              PhysCellId,
        ssb-Num                 INTEGER (1..Kmax),
    ...
}
``` where ssb-Num-list represents the first indication information list which includes multiple ssb-Num structures, and Cmax represents a length of the first indication information list. In the ssb-Num structure, physCellId represents a cell identifier, the ssb-Num parameter represents the first indication information corresponding to the cell identified as physCellId, (1 . . . Kmax) represents a value range of the first indication information, and Kmax represents a maximum value of the first quantity.

Based on this exemplary message structure, the terminal device reads the ssb-Num-list parameter after receiving the MeasObjectNR message, and then reads one or more ssb-Num structures from the ssb-Num-list parameter, reads the ssb-Num parameter corresponding to the cell with the identifier of physCellId from each ssb-Num structure, as the first indication information, determines the first quantity based on the ssb-Num parameter, and determines whether the SSBs with the cell identifier of physCellId are QCL according to the first quantity.

In the example where the first indication information is in the first design manner mentioned above, that is, the first indication information includes the number of the SSBs actually sent by the network device and the first quantity is the number of the SSBs actually sent by the network device, an example of the message structure for carrying the first indication information by the network device in the RRC reconfiguration message configured by the measurement object is as follows.

```
MeasObjectNR ::=        SEQUENCE {
    ...
        ssb-Num-list    SEQUENCE (SIZE (1..Cmax)) OF
    ...
}
ssb-Num ::=             SEQUENCE {
    ...
        physCellId              PhysCellId,
        ssb-Num                 INTEGER (1..Kmax),
    ...
}
``` where ssb-Num-list represents the first indication information list which includes multiple ssb-Num structures, and Cmax represents a length of a cell list (the first indication information list). In the ssb-Num structure, physCellId represents a cell identifier, ssb-Num represents the first indication information corresponding to the cell identified as physCellId, (1 . . . Kmax) represents a value range of the first indication information, and Kmax represents a maximum value of the first quantity.

In the example where the first indication information is in the second design manner mentioned above, that is, the first quantity indicated by the first indication information is an certain integer determined by the nth power of 2, an example of the message structure for carrying the first indication information by the network device in the RRC reconfiguration message configured by the measurement object is as follows.

```
MeasObjectNR ::=           SEQUENCE {
    ...
    ssb-Num-list       SEQUENCE (SIZE (1..Cmax)) OF ssb-Num,
    ...
}
ssb-Num ::=                SEQUENCE {
    ...
    physCellId              PhysCellId,
    ssb-Num                 INTEGER (1..Kmax),
    ...
}
``` where ssb-Num-list represents the first indication information list which includes multiple ssb-Num structures, and Cmax represents a length of a cell list (the first indication information list). In the ssb-Num structure, physCellId represents a cell identifier, the ssb-Num parameter represents the first indication information corresponding to the cell identified as physCellId, (1 . . . Kmax) represents a value range of the first indication information, and Kmax represents a maximum value of the first quantity.

In a second case, the RRC reconfiguration message carries one first indication information list which includes one or more pieces of the first indication information, and each piece of the first indication information may be applied to multiple cells.

In this case, the MeasObjectNR message in the RRC reconfiguration message carries one first indication information list which includes one or more pieces of first indication information, and each piece of first indication information can be applied to multiple cell. An example of the message structure for carrying the first indication information by the network device in the RRC reconfiguration message configured by the measurement object is as follows.

```
MeasObjectNR ::=           SEQUENCE {
    ...
    ssb-Num-list       SEQUENCE (SIZE (1..Qmax)) OF ssb-Num,
    ...
}
ssb-Num ::=                SEQUENCE {
    ...
    ssb-Num                 INTEGER (1..Kmax),
    Q_physCellId-list       Q_PhysCellId-list,
    ...
}
``` where ssb-Num-list represents the first indication information list which includes multiple ssb-Num structures, and Qmax represents a length of the first indication information list. In the ssb-Num structure, the ssb-Num parameter represents the first indication information, (1 . . . Kmax) represents a value range of the first indication information, and Kmax represents the maximum value of the first quantity. The Q_physCellId-list parameter indicates a group of cells to which the ssb-Num parameter applies and which includes one or more cells.

Based on this exemplary message structure, the terminal device reads the ssb-Num-list parameter after receiving the MeasObjectNR message, and then reads one or more ssb-Num structures from the ssb-Num-list parameter, reads the cell list Q_physCellId-list from each ssb-Num structure, reads the ssb-Num parameter as the first indication information, and determines the first quantity based on the ssb-Num parameter. The cells in the cell list Q_physCellId-list determine whether the SSBs are QCL according to the first quantity.

Figure 6:
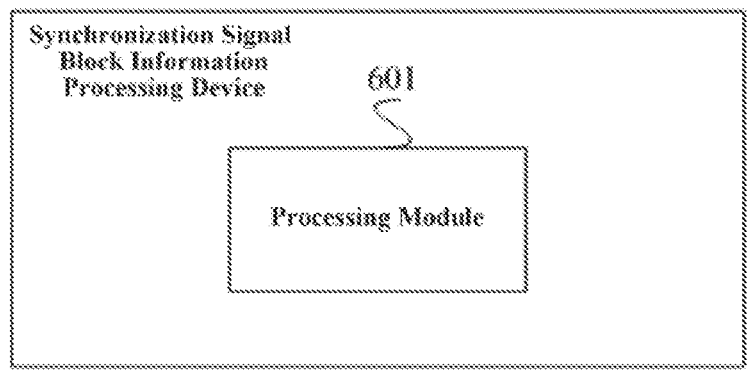
FIG. 6 is a block diagram of a module structure of a synchronization signal block information processing device according to an embodiment of the application.

FIG. 6 is a block diagram of a module structure of a synchronization signal block information processing device according to an embodiment of the present application. As shown in FIG. 6, the synchronization signal block information processing device includes:

a processing module 601 configured to determine whether a first SSB and a second SSB are QCL according to identifiers of the first and second SSBs, and the first indication information, where the identifier indicates a transmission position of the SSB within a set period of time.

In a possible implementation, the first indication information is used for indicating a first quantity which is related to a number of SSBs sent by a network device within the set period of time.

In a possible implementation, the identifiers of the first and second SSBs are SSB numbers.

In a possible implementation, the processing module 601 is specifically configured to:

determine that the first SSB and the second SSB are QCL when a result of the SSB number of first SSB mod the first quantity is equal to a result of the SSB number of the second SSB mod the first quantity.

In a possible implementation, the first indication information includes the number of the sent SSBs, and the first quantity is the number of the sent SSBs.

In a possible implementation, the first indication information includes n, and the first quantity is obtained by rounding up the number of the sent SSBs up to nth power of 2, where n is an integer greater than or equal to 0.

In a possible implementation, the first indication information includes m, and the first quantity is obtained by rounding up the number of the sent SSBs up to 2 m, where m is an integer greater than or equal to 1.

In a possible implementation, the first indication information is indicated by a MIB.

In a possible implementation, the first indication information is indicated by information carried by a PBCH.

In a possible implementation, the first indication information is indicated by a DMRS sequence of the PBCH.

In a possible implementation, the first indication information is indicated by a SIB.

In a possible implementation, the first indication information is indicated by a RRC message.

In a possible implementation, the RRC message includes an RRC reconfiguration message.

In a possible implementation, the first SSB and the second SSB are in the same set period of time, or in different set periods of time.

In a possible implementation, the set period of time is half of a frame period, or 2 ms, 4 ms, or 8 ms.

The synchronization signal block information processing device provided in the embodiments of the present application can carry out the actions of the terminal device in the foregoing method embodiments, and its implementation principles and technical effects are similar and will not be repeated here.

Figure 7:
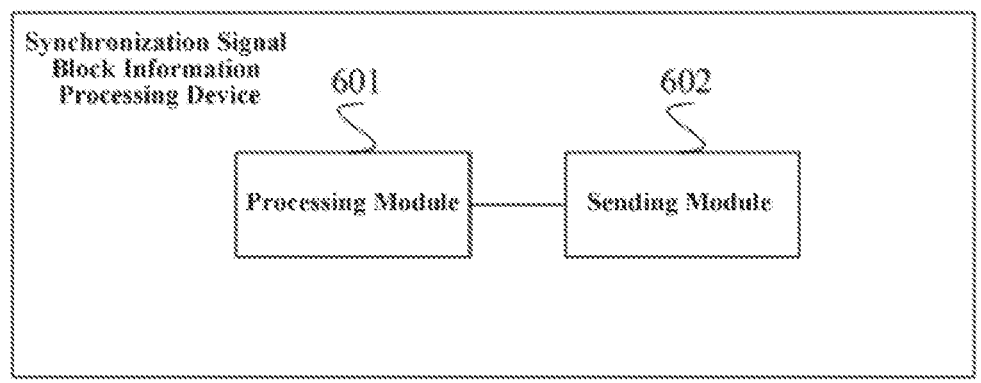
FIG. 7 is a block diagram of a module structure of another synchronization signal block information processing device according to an embodiment of the application.

FIG. 7 is a block diagram of a module structure of a synchronization signal block information processing device according to an embodiment of the application. As shown in FIG. 7, the synchronization signal block information processing device includes:

a processing module 701 and a sending module 702.

The processing module 701 is configured to send a first SSB and a second SSB to a terminal device through the sending module 702, so that the terminal device determines whether the first SSB and the second SSB are QCL according to identifiers of the first and second SSBs, and first indication information, where the identifier indicates a transmission position of the SSB within a set period of time.

In a possible implementation, the first indication information is used for indicating a first quantity which is related to a number of SSBs sent by a network device within the set period of time.

In a possible implementation, the identifiers of the first and second SSBs are SSB numbers.

In a possible implementation, the first indication information includes the number of the sent SSBs, and the first quantity is the number of the sent SSBs.

In a possible implementation, the first indication information includes n, and the first quantity is obtained by rounding up the number of the sent SSBs up to nth power of 2, where n is an integer greater than or equal to 0.

In a possible implementation, the first indication information includes m, and the first quantity is obtained by rounding up the number of the sent SSBs up to 2 m, where m is an integer greater than or equal to 1.

In a possible implementation, the first indication information is indicated by a MIB.

In a possible implementation, the first indication information is indicated by information carried by a PBCH.

In a possible implementation, the first indication information is indicated by a DMRS sequence of the PBCH.

In a possible implementation, the first indication information is indicated by a SIB.

In a possible implementation, the first indication information is indicated by an RRC message.

In a possible implementation, the RRC message includes an RRC reconfiguration message.

In a possible implementation, the first SSB and the second SSB are in the same set period of time, or in different set periods of time.

In a possible implementation, the set period of time is half of a frame period, or 2 ms, 4 ms, or 8 ms.

The synchronization signal block information processing device provided in the embodiments of the present application can carry out the actions of the network device in the foregoing method embodiments, and its implementation principles and technical effects are similar and will not be repeated here.

It should be noted that the above sending module may be a transmitter in actual implementations, and the processing module may be implemented in the form of software revoked by a processing element, or in the form of hardware. For example, the processing module may be a separate processing element, or may be integrated in a chip of the above-mentioned device. In addition, it may also be stored in the memory of the above-mentioned device in the form of program codes which are revoked by a certain processing element of the above device to carry out the functions of the processing module. In addition, all or part of these modules can be integrated together or implemented independently. The processing element described herein may be an integrated circuit with signal processing capability. In the implementations, the steps of the above methods or the above modules can be realized by hardware integrated logic circuits in the processor element or instructions in the form of software.

For example, the above modules may be one or more integrated circuits configured to implement the above methods such as one or more application specific integrated circuits (ASIC), one or more microprocessors (digital signal processors. DSPs), one or more field programmable gate arrays (FPGAs), or the like. For another example, when one of the above modules is implemented in the form of program codes scheduled by a processing element, the processing element may be a general-purpose processor, such as a central processing unit (CPU) or other processors that can revoke the program codes. For another example, these modules can be integrated together and implemented in the form of a system-on-a-chip (SOC).

Figure 8:
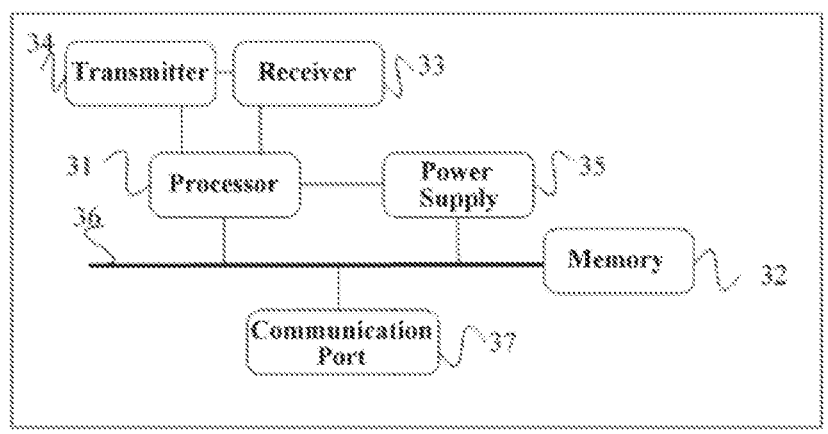
FIG. 8 is a schematic structural diagram of another terminal device according to an embodiment of the present application.

FIG. 8 is a schematic structural diagram of another terminal device according to an embodiment of the present application. As shown in FIG. 8, the terminal device can include a processor 31 such as a CPU, a memory 32, a receiver 33, and a transmitter 34. Both the receiver 33 and the transmitter 34 are coupled to the processor 31 which controls a receiving action of the transmitter 33 and a sending action of the transmitter 34. The memory 32 may include a high-speed random-access memory (RAM) or may further include a non-volatile memory (NVM), such as at least one disk storage. The memory 32 can store various instructions for carrying out various processing functions and implementing the method steps of the present application. In some embodiments, the terminal device involved in the present application may further include a power supply 35, a communication bus 36, and a communication port 37. The receiver 33 and the transmitter 34 may be integrated in a transceiver of the terminal device, or may be independent transceiver antennas on the terminal device. The communication bus 36 is used for communication connections between components. The communication port 37 is used for connection and communication between the terminal device and other peripherals.

In the embodiments of the present application, the memory 32 is used to store computer executable program codes including instructions which, when being executed by the processor 31, cause the processor 31 of the terminal device to perform the processing actions of the terminal device in the above method embodiments so that the receiving action of the terminal device in the foregoing method embodiments is performed by the receiver 33, and the sending action of the terminal device in the foregoing method embodiments is performed by the transmitter 34. The implementation principles and technical effects are similar, and will not be repeated here.

Figure 9:
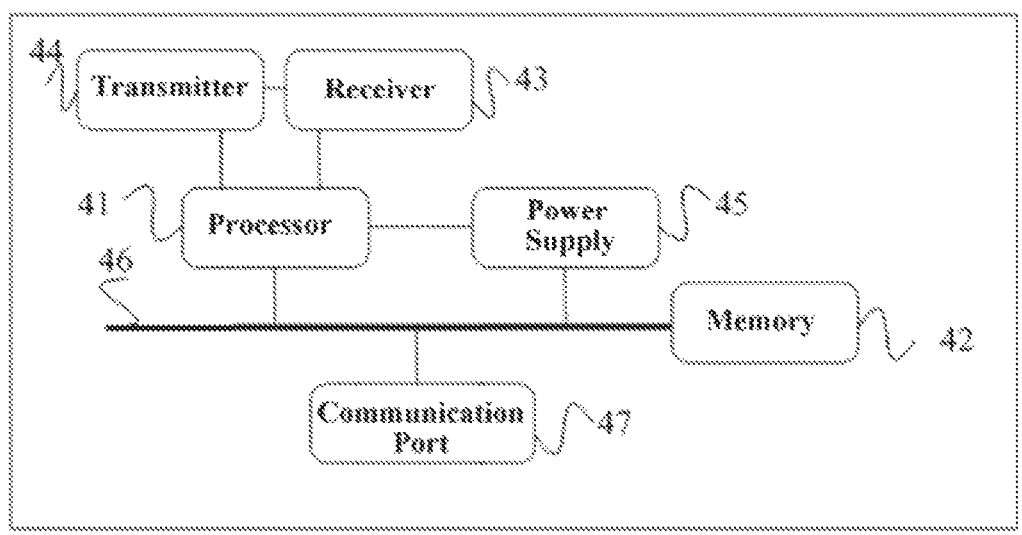
FIG. 9 is a schematic structural diagram of another network device according to an embodiment of the present application.

FIG. 9 is a schematic structural diagram of another network device according to an embodiment of the present application. As shown in FIG. 9, the network device can include a processor 41 such as a CPU, a memory 42, a receiver 43, and a transmitter 44. The receiver 43 and the transmitter 44 are both coupled to the processor 41 which controls a receiving action of the receiver and a sending action of the transmitter 44. The memory 42 may include a high-speed RAM, or can further include a non-volatile memory NVM, such as at least one disk storage. The memory 42 can store various instructions for carrying out various processing functions and implementing the method steps of the present application. In some embodiments, the network device involved in the present application may further include a power supply 45, a communication bus 46, and a communication port 47. The receiver 43 and the transmitter 44 may be integrated in a transceiver of the network device, or may be independent transceiver antennas on the network device. The communication bus 46 is used for communication connections between components. The communication port 47 is used for connections and communication between the network device and other peripherals.

In the present application, the memory 42 is used to store computer executable program codes including instructions which, when being executed by the processor 41, cause the processor 41 of the network device to perform the processing actions of the network device in the above method embodiments so that the receiving action of the network device in the foregoing method embodiments is performed by the receiver 43 and the sending action of the network device in the foregoing method embodiments is performed by the transmitter 44. The implementation principles and technical effects are similar, and will not be repeated here.

According to the embodiments of the present application, there is provided a communication device which can be the terminal device in the foregoing method implementations, or a chip arranged in the terminal device. The communication device includes a processor which is coupled with a memory and can be configured to execute instructions in a memory to implement the methods in the various possible implementations as described above. In some embodiments, the communication device further includes the memory. In some embodiments, the communication device further includes a communication interface to which the processor is coupled.

When the communication device is the terminal device, the communication interface can be a transceiver, or an input/output interface.

When the communication device is the chip arranged in the terminal device, the communication interface can be an input/output interface.

In some embodiments, the transceiver may be a transceiver circuit. In some embodiments, the input/output interface may be an input/output circuit.

According to the embodiments of the present application, there is provided a communication device which can be the network device in the foregoing method implementations, or a chip arranged in the network device. The communication device includes a processor which is coupled with a memory and can be configured to execute instructions in the memory to implement the methods in the various possible implementations as described above. In some embodiments, the communication device further includes the memory. In some embodiments, the communication device further includes a communication interface to which the processor is coupled.

When the communication device is the network device, the communication interface may be a transceiver, or an input/output interface.

When the communication device is the chip arranged in the network device, the communication interface may be an input/output interface.

In some embodiments, the transceiver may be a transceiver circuit. In some embodiments, the input/output interface may be an input/output circuit.

According to the embodiments of the present application, there is provided a communication system including a network device and a terminal device. The terminal device is configured to perform the methods in the foregoing various possible implementations. The network device is configured to perform the methods in the foregoing various possible implementations.

According to the embodiments of the present application, there is provided a chip, which is connected to a memory and configured to read and execute a software program stored in the memory, so as to implement the methods provided in the foregoing embodiments.

According to the embodiments of the present application, there is provided a chip that includes a processor and a memory, and the processor is configured to read a software program stored in the memory to implement the methods provided in the above-mentioned implementations.

The above embodiments may be implemented entirely or partly in software, hardware, firmware or any combination thereof. When implemented in software, it can be implemented entirely or partly in the form of a computer program product. The computer program product includes one or more computer instructions. When the computer program instructions are loaded and executed on the computer, the processes or functions in accordance with the embodiments of the present application are entirely or partly generated. The computer can be a general-purpose computer, a dedicated computer, a computer network, or other programmable devices. The computer instructions can be stored in a computer-readable storage medium, or transmitted from one computer-readable storage medium to another. For example, the computer instructions can be transmitted from a website, a computer, a server, or a data center to another website site, computer, server or data center in a wired manner such as through a coaxial cable, an optical fiber or a digital subscriber line (DSL) or in a wireless manner such as an infrared, wireless, microwave manner or the like. A computer-readable storage medium may be any available medium that can be accessed by a computer or a data storage device such as a server or data center integrated with one or more available media. The available medium may be a magnetic medium (such as a floppy disk, a hard disk, a magnetic tape), an optical medium (such as a DVD), or a semiconductor medium (such as a solid state disk (SSD)).

It can be understood that the various numerical numbers involved in the embodiments of the present application are distinguished only for ease of description, and are not intended to limit the scope of the embodiments of the present application.

It can be understood that in the embodiments of the present application, the sequence numbers of the above-mentioned processes do not mean the performing order, and the performing order of the processes should be determined according to the functions and the internal logic thereof, and should not be limited in the implementations of the embodiments of the present application.

What is claimed is:

1. A synchronization signal block information processing method, applied in shared spectrum channel access, the method comprising:
   obtaining, by a terminal device, identifiers of multiple SS/PBCH blocks (SSBs), wherein the identifier of the SSB is determined in accordance with demodulation reference signal (DMRS) sequences of physical broadcast channels (PBCHs), and the identifier of the SSB is used for indicating a transmission position of the SSB within a set period of time;
   obtaining, by the terminal device, first indication information, wherein the first indication information is used for indicating a first quantity and comprises n, and the first quantity is obtained by rounding up a number of SSBs sent by a network device within the set period of time up to $n^{th}$ power of 2, wherein n is an integer greater than or equal to 0; and
   determining, by the terminal device, that a first SSB in the multiple SSBs and a second SSB in the multiple SSBs are quasi-co-located (QCL) in accordance with an identifier of the first SSB, an identifier of the second SSB and the first quantity.

2. The method according to claim 1, wherein the identifier of the first SSB and the identifier of the second SSB are SSB numbers, and
   wherein the determining, by the terminal device, that the first SSB in the multiple SSBs and the second SSB in the multiple SSBs are quasi-co-located (QCL) in accordance with the identifier of the first SSB, the identifier of the second SSB and the first quantity comprises:
   determining that the first SSB and the second SSB are QCL when a result of the SSB number of the first SSB mod the first quantity is equal to a result of the SSB number of the second SSB mod the first quantity.

3. The method according to claim 1, wherein the first indication information is indicated by a master information block (MIB), a system information block (SIB) or a radio resource control (RRC) message.

4. The method according to claim 3, wherein one piece of the first indication information is carried in the SIB message, and the piece of the first indication information is for all cells at a frequency point corresponding to the SIB message.

5. The method according to claim 4, wherein the determining, by the terminal device, that the first SSB in the multiple SSBs and the second SSB in the multiple SSBs are quasi-co-located (QCL) in accordance with the identifier of the first SSB, the identifier of the second SSB and the first quantity is for all the cells at the frequency point corresponding to the SIB message.

6. The method according to claim 3, wherein the first indication information is carried in a first indication information list of the SIB message, the first indication information list comprises multiple pieces of first indication information, and each piece of first indication information corresponds to one or more cells.

7. The method according to claim 6, wherein the determining, by the terminal device, that the first SSB in the multiple SSBs and the second SSB in the multiple SSBs are quasi-co-located (QCL) in accordance with the identifier of the first SSB, the identifier of the second SSB and the first quantity is for all the cells at a frequency point corresponding to the SIB message.

8. The method according to claim 3, wherein the RRC message comprises an RRC reconfiguration message, and
   wherein one piece of the first indication information is carried in the RRC reconfiguration message, and the piece of the first indication information is for all cells at a frequency point corresponding to the RRC reconfiguration message.

9. The method according to claim 8, wherein the determining, by the terminal device, that the first SSB in the multiple SSBs and the second SSB in the multiple SSBs are quasi-co-located (QCL) in accordance with the identifier of the first SSB, the identifier of the second SSB and the first quantity is for all the cells at the frequency point corresponding to the RRC reconfiguration message.

10. The method according to claim 3, wherein the RRC message comprises an RRC reconfiguration message, and
    wherein the first indication information is carried in a first indication information list of the RRC reconfiguration message, the first indication information list comprises multiple pieces of first indication information, and each piece of first indication information corresponds to one or more cells.

11. The method according to claim 10, wherein the determining, by the terminal device, that the first SSB in the multiple SSBs and the second SSB in the multiple SSBs are quasi-co-located (QCL) in accordance with the identifier of the first SSB, the identifier of the second SSB and the first quantity is for all the cells at a frequency point corresponding to the RRC reconfiguration message.

12. The method according to claim 1, wherein the first SSB and the second SSB are within a same set period of time, or in different set periods of time.

13. The method according to claim 1, wherein the set period of time is half of a frame period, or 2 ms, 4 ms, or 8 ms.

14. A synchronization signal block information processing method, applied in shared spectrum channel access, the method comprising:
    indicating, by a network device, first indication information to a terminal device, wherein the first indication information is used for indicating a first quantity and comprises n, the first quantity is obtained by rounding up a number of SSBs sent by a network device within a set period of time up to $n^{th}$ power of 2, wherein n is an integer greater than or equal to 0; and
    sending, by the network device, a first SSB and a second SSB to the terminal device so that the terminal device determines that the first SSB and the second SSB are quasi co-located (QCL) in accordance with an identifier of the first SSB, an identifier of the second SSB and the first quantity, wherein the identifier of the SSB is determined in accordance with demodulation reference signal (DMRS) sequences of physical broadcast channels (PBCHs), and the identifier of the SSB is used for indicating a transmission position of the SSB within the set period of time.

15. The method according to claim 14, wherein the identifier of the first SSB and the identifier of the second SSB are SSB numbers, and
    wherein the terminal device determining that the first SSB and the second SSB are quasi co-located (QCL) in accordance with the identifier of the first SSB, the identifier of the second SSB and the first quantity comprises:
    determining that the first SSB and the second SSB are QCL when a result of the SSB number of the first SSB mod the first quantity is equal to a result of the SSB number of the second SSB mod the first quantity.

16. The method according to claim 14, wherein the first indication information is indicated by a master information block (MIB), a system information block (SIB) or a radio resource control (RRC) message.

17. The method according to claim 16, wherein one piece of the first indication information is carried in the SIB message, and the piece of the first indication information is for all cells at a frequency point corresponding to the SIB message.

18. The method according to claim 17, wherein the terminal device determining that the first SSB and the second SSB are quasi co-located (QCL) in accordance with the identifier of the first SSB, the identifier of the second SSB and the first quantity is for all the cells at the frequency point corresponding to the SIB message.

19. The method according to claim 16, wherein the first indication information is carried in a first indication information list of the SIB message, the first indication information list comprises multiple pieces of first indication information, and each piece of first indication information corresponds to one or more cells.

20. The method according to claim 19, wherein the terminal device determining that the first SSB and the second SSB are quasi co-located (QCL) in accordance with the identifier of the first SSB, the identifier of the second SSB and the first quantity is for all the cells at a frequency point corresponding to the SIB message.

21. The method according to claim 16, wherein the RRC message comprises an RRC reconfiguration message, and
wherein one piece of the first indication information is carried in the RRC reconfiguration message, and the piece of the first indication information is for all cells at a frequency point corresponding to the RRC reconfiguration message.

22. The method according to claim 21, wherein the terminal device determining that the first SSB and the second SSB are quasi co-located (QCL) in accordance with the identifier of the first SSB, the identifier of the second SSB and the first quantity is for all the cells at the frequency point corresponding to the RRC reconfiguration message.

23. The method according to claim 16, wherein the RRC message comprises an RRC reconfiguration message, and
wherein the first indication information is carried in a first indication information list of the RRC reconfiguration message, the first indication information list comprises multiple pieces of first indication information, and each piece of first indication information corresponds to one or more cells.

24. The method according to claim 23, wherein the terminal device determining that the first SSB and the second SSB are quasi co-located (QCL) in accordance with the identifier of the first SSB, the identifier of the second SSB and the first quantity is for all the cells at a frequency point corresponding to the RRC reconfiguration message.

25. The method according to claim 14, wherein the first SSB and the second SSB are within a same set period of time, or in different set periods of time.

26. The method according to claim 14, wherein the set period of time is half of a frame period, or 2 ms, 4 ms, or 8 ms.

27. A synchronization signal block information processing device, applied in shared spectrum channel access, the device comprising:
a processor configured to:
obtain identifiers of multiple SS/PBCH blocks (SSBs), wherein the identifier of SSB is determined in accordance with demodulation reference signal (DMRS) sequences of physical broadcast channels (PBCHs), and the identifier of the SSB is used for indicating a transmission position of the SSB within a set period of time;
obtain first indication information, wherein the first indication information is used for indicating a first quantity and comprises n, and the first quantity is obtained by rounding up a number of SSBs sent by a network device within the set period of time up to $n^{th}$ power of 2, wherein n is an integer greater than or equal to 0; and
determine that a first SSB in the multiple SSBs and a second SSB in the multiple SSBs are quasi-co-located (QCL) in accordance with an identifier of the first SSB, an identifier of the second SSB and the first quantity, wherein the first indication information comprises n, n being an integer greater than or equal to 0, and the first quantity is obtained by rounding up the number of the sent SSBs up to $n^{th}$ power of 2.

28. A synchronization signal block information processing device, applied in shared spectrum channel access, the device comprising:
a processor configured to indicate first indication information to a terminal device, wherein the first indication information is used for indicating a first quantity and comprises n, and the first quantity is obtained by rounding up a number of SSBs sent by a network device within a set period of time up to $n^{th}$ power of 2, wherein n is an integer greater than or equal to 0, and
a transceiver configured to send a first SSB and a second SSB to the terminal device, so that the terminal device determines that the first SSB and the second SSB are quasi co-located (QCL) in accordance with an identifier of the first SSB, an identifier of the second SSB and the first quantity, wherein the identifier of the SSB is determined in accordance with demodulation reference signal (DMRS) sequences of physical broadcast channels (PBCHs), and the identifier of the SSB is used for indicating a transmission position of the SSB within the set period of time.

* * * * *

UNITED STATES PATENT AND TRADEMARK OFFICE
CERTIFICATE OF CORRECTION

PATENT NO. : 11,638,226 B2
APPLICATION NO. : 17/353732
DATED : April 25, 2023
INVENTOR(S) : Hai Tang Page 1 of 1

It is certified that error appears in the above-identified patent and that said Letters Patent is hereby corrected as shown below:

On the Title Page

Item [30], insert:
--February 15, 2019 (CN)............PCT/CN2019/075282--

Signed and Sealed this
Twenty-ninth Day of August, 2023

Katherine Kelly Vidal
*Director of the United States Patent and Trademark Office*